(12) United States Patent
Peters et al.

(10) Patent No.: US 11,731,208 B2
(45) Date of Patent: Aug. 22, 2023

(54) SYSTEMS AND METHODS PROVIDING DYNAMIC BEAD SPACING AND WEAVE FILL IN ADDITIVE MANUFACTURING

(71) Applicant: Lincoln Global, Inc., Santa Fe Springs, CA (US)

(72) Inventors: Andrew R. Peters, Chesterland, OH (US); Jonathan H. Paul, Knoxville, TN (US); Levi J. Mitchell, Windsor, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 17/679,218

(22) Filed: Feb. 24, 2022

(65) Prior Publication Data
US 2022/0176483 A1 Jun. 9, 2022

Related U.S. Application Data

(63) Continuation of application No. 16/239,602, filed on Jan. 4, 2019, now Pat. No. 11,305,366.

(51) Int. Cl.
*B23K 9/02* (2006.01)
*B23K 26/342* (2014.01)
(Continued)

(52) U.S. Cl.
CPC ............ *B23K 9/0216* (2013.01); *B23K 9/025* (2013.01); *B23K 9/028* (2013.01); *B23K 9/0953* (2013.01);
(Continued)

(58) Field of Classification Search
CPC ...... B23K 9/0216; B23K 9/025; B23K 9/028; B23K 9/0953; B23K 9/125; B23K 9/126;
(Continued)

(56) References Cited

U.S. PATENT DOCUMENTS

| 4,608,481 A | 8/1986 | Nomura et al. |
| 4,728,774 A | 3/1988 | Hayakawa |

(Continued)

FOREIGN PATENT DOCUMENTS

| CN | 106735730 A | 5/2017 |
| CN | 107414259 A | 12/2017 |

(Continued)

OTHER PUBLICATIONS

Xiong, et al.; "Adaptive control of deposited height in GMAW-based layer additive manufacturing;" Journal of Materials Processing Technology; Dated Apr. 2014; vol. 214; pp. 962-968.

(Continued)

*Primary Examiner* — Brian W Jennison
(74) *Attorney, Agent, or Firm* — David J. Muzilla

(57) ABSTRACT

Embodiments of systems and methods of additive manufacturing are disclosed. In one embodiment, a computer control apparatus accesses multiple planned build patterns corresponding to multiple build layers of a three-dimensional (3D) part to be additively manufactured. A metal deposition apparatus deposits metal material to form at least a portion of a build layer of the 3D part. The metal material is deposited as a beaded weave pattern, based on a planned path of a planned build pattern, under control of the computer control apparatus. A weave width, a weave frequency, and a weave dwell of the beaded weave pattern may be dynamically adjusted during deposition of the beaded weave pattern. The adjustments are under control of the computer control apparatus based on the planned build pattern, as a width of the build layer varies along a length dimension of the build layer.

19 Claims, 15 Drawing Sheets

(51) Int. Cl.
- *B23K 9/025* (2006.01)
- *B23K 9/028* (2006.01)
- *B23K 9/095* (2006.01)
- *B23K 9/12* (2006.01)
- *B33Y 10/00* (2015.01)
- *B23K 37/02* (2006.01)
- *B23K 37/04* (2006.01)
- *B33Y 30/00* (2015.01)
- *B33Y 50/02* (2015.01)

(52) U.S. Cl.
CPC .............. *B23K 9/125* (2013.01); *B23K 9/126* (2013.01); *B23K 26/342* (2015.10); *B23K 37/0252* (2013.01); *B23K 37/04* (2013.01); *B33Y 10/00* (2014.12); *B33Y 30/00* (2014.12); *B33Y 50/02* (2014.12)

(58) Field of Classification Search
CPC .. B23K 26/342; B23K 37/0252; B23K 37/04; B33Y 10/00; B33Y 30/00; B33Y 50/02
See application file for complete search history.

(56) References Cited

U.S. PATENT DOCUMENTS

| | | | |
|---|---|---|---|
| 4,782,206 A | 11/1988 | Ayres et al. | |
| 9,511,442 B2 | 12/2016 | Panelli | |
| 2005/0023261 A1 | 2/2005 | Zheng et al. | |
| 2008/0053978 A1 | 3/2008 | Peters et al. | |
| 2008/0203072 A1 | 8/2008 | Hedenfalk et al. | |
| 2011/0259854 A1 | 10/2011 | Kamo et al. | |
| 2012/0160819 A1 | 6/2012 | Enyedy | |
| 2014/0008354 A1 | 1/2014 | Pletcher et al. | |
| 2014/0353298 A1 | 12/2014 | Adock et al. | |
| 2016/0001389 A1 | 1/2016 | Kim | |
| 2016/0254669 A1 | 9/2016 | Zhang et al. | |
| 2018/0345413 A1 | 12/2018 | Wuest et al. | |
| 2020/0324403 A1 | 10/2020 | Kashikar et al. | |

FOREIGN PATENT DOCUMENTS

| | | |
|---|---|---|
| JP | S58-192681 A | 11/1983 |
| JP | 2586091 B2 | 2/1997 |
| KR | 2003-0096151 A | 12/2003 |
| KR | 10-1750783 B1 | 6/2017 |
| KR | 10-2017-0124475 A | 11/2017 |

OTHER PUBLICATIONS

Ding, et al.; "A multi-bead overlapping model for robotic wire and arc additive manufacturing (WAAM);" University of Wollongong, Research Online; Robotics and Computer-Integrated Manufacturing; vol. 31; Dated 2015; pp. 101-110.

Lincoln Electric; Variables that Affect Weld Penetration; https://www.lincolnelectric com/en-ca/support/process-and-theory/Pages/variables-weld-penetration.aspx; Accessed on Jul. 18, 2018; pp. 1-4.

Vilarinho, et al.; "Effect of Waveform and Shielding Gas on Melting Rate and Bead Geometry for GMAW-VP and Correlation to Kinematics of Metal Transfer;" Conference: 9th International Conference on Trends in Welding Research American Society for Metals; Dated Jun. 5, 2012; pp. 438-447.

Extended European Search Report from Corresponding Application No. EP2015005.5; Dated Jul. 6, 2020; pp. 1-7.

SYSTEMS AND METHODS PROVIDING DYNAMIC BEAD SPACING AND WEAVE FILL IN ADDITIVE MANUFACTURING

CROSS REFERENCE TO RELATED APPLICATIONS/INCORPORATION BY REFERENCE

This U.S. Patent Application is a Continuation of U.S. patent application Ser. No. 16/239,602, filed on Jan. 4, 2019, and is incorporated herein by reference in its entirety. U.S. Published Patent Application No. 2017/0252847 A1 published on Sep. 7, 2017 is incorporated herein by reference in its entirety.

FIELD

Embodiments of the present invention relate to systems and methods related to additive manufacturing, and more specifically to systems and methods supporting metal filling of a build layer during an additive manufacturing process.

BACKGROUND

Conventionally, additive manufacturing processes are able to make near net shape parts at relatively low deposition rates where each part is built up layer-by-layer. However, build times can be long, and present infill techniques can be inadequate for additively manufacturing certain types of parts (e.g., parts where the width of a build layer varies).

SUMMARY

Embodiments of the present invention include systems and methods related to additive manufacturing that provide for the efficient infilling of build layers of a three-dimensional (3D) part during additive manufacturing.

In one embodiment, an additive manufacturing system is provided. Patterns of multiple layers of a 3D part to be additively manufactured are represented and stored as digital data within the system, in accordance with one embodiment. The digital data may be from a CAD model or from a scanned part, for example. The system includes a computer control apparatus configured to access multiple planned build patterns stored as digital data and corresponding to multiple build layers of a three-dimensional (3D) part to be additively manufactured. The system also includes a metal deposition apparatus configured to deposit metal material to form at least a portion of a build layer of the multiple build layers of the 3D part. The metal material is deposited as a beaded weave pattern, in accordance with a planned path of a planned build pattern of the multiple planned build patterns, under control of the computer control apparatus, where the planned build pattern corresponds to the build layer. A weave width, a weave frequency, and a weave dwell of the beaded weave pattern, and/or a travel speed in a deposition travel direction along a length dimension of the build layer, are dynamically adjusted during deposition of the beaded weave pattern. The adjustments are made under control of the computer control apparatus in accordance with the planned build pattern, as a width of the build layer varies along the length dimension of the build layer. The result is a dynamically varying bead width of the beaded weave pattern. In one embodiment, a robot is operatively connected to at least a portion of the metal deposition apparatus. The robot is configured to be controlled by the computer control apparatus during the deposition of the beaded weave pattern to move at least the portion of the metal deposition apparatus relative to the 3D part being additively manufactured in accordance with the planned path of the planned build pattern. In one embodiment, a robot is operatively connected to a base holding the 3D part being additively manufactured. The robot is configured to be controlled by the computer control apparatus during the deposition of the beaded weave pattern to move the base relative to the metal deposition apparatus in accordance with the planned path of the planned build pattern. In one embodiment, the metal deposition apparatus includes a deposition tool having a contact tip, a wire feeder configured to feed a consumable wire electrode of the metal material toward the 3D part through the deposition tool, and a power source operatively connected to the wire feeder. The power source is configured to provide energy to melt at least the consumable wire electrode during the deposition of the beaded weave pattern by forming an arc between the consumable wire electrode and the 3D part. In one embodiment, the metal deposition apparatus includes a wire feeder configured to feed a filler wire of the metal material toward the 3D part, a power source, and a laser operatively connected to the power source. The power source and the laser are configured to provide energy in the form of a laser beam to melt at least the filler wire during the deposition of the beaded weave pattern. In one embodiment, the metal deposition apparatus includes a wire feeder configured to feed a filler wire of the metal material toward the 3D part, a power source, and a non-consumable electrode operatively connected to the power source. The power source and the non-consumable electrode are configured to provide energy to melt at least the filler wire during the deposition of the beaded weave pattern by forming an arc between the non-consumable electrode and the 3D part. In one embodiment, the metal deposition apparatus includes a first wire feeder configured to feed a filler wire of the metal material toward the 3D part, a power source, and a second wire feeder operatively connected to the power source and configured to feed a consumable wire electrode of the metal material toward the 3D part. The power source is configured to provide energy to melt at least the consumable wire electrode and the filler wire during the deposition of the beaded weave pattern by forming an arc between the consumable wire electrode and the 3D part. In one embodiment, a substantially constant metal deposition rate of the metal material is maintained during the deposition of the beaded weave pattern under control of the computer control apparatus. In one embodiment, a substantially constant contact tip-to-work distance (CTWD) is maintained during the deposition of the beaded weave pattern under control of the computer control apparatus. A wave shape of the beaded weave pattern may be, for example, one of a substantially sinusoidal shape, a substantially triangular shape, or a substantially rectangular shape, based on the planned build pattern, in accordance with various embodiments.

One embodiment includes an additive manufacturing method of filling a build layer of an additively manufactured part. The method includes accessing a planned build pattern of multiple planned build patterns, stored as digital data, via a computer control apparatus. The multiple planned build patterns correspond to multiple build layers of a three-dimensional (3D) part being additively manufactured. The method further includes depositing a beaded weave pattern of metal material in a deposition travel direction along a length dimension of a build layer of the multiple build layers, via a metal deposition apparatus. The deposition is under the control of the computer control apparatus and is performed in accordance with a planned path of the planned build pattern as a width of the build layer varies along the length dimension. The method also includes dynamically adjusting at least one of a weave width, a weave frequency, and a weave dwell of the beaded weave pattern, and/or a travel speed in the deposition travel direction during deposition. The adjustments are made under the control of the computer control apparatus, in accordance with the planned build pattern, as the width varies along the length dimension. The result is a dynamically varying bead width of the beaded weave pattern. In one embodiment, the method includes controlling a robot, operatively connected to at least a portion of the metal deposition apparatus, via the computer control apparatus during the depositing of the beaded weave pattern to move at least the portion of the metal deposition apparatus relative to the 3D part being additively manufactured in accordance with the planned path of the planned build pattern. In one embodiment, the method includes controlling a robot, operatively connected to a base holding the 3D part being additively manufactured, via the computer control apparatus during the deposition of the beaded weave pattern to move the base relative to the metal deposition apparatus in accordance with the planned path of the planned build pattern. In one embodiment, the method includes feeding a consumable wire electrode of the metal material toward the 3D part via a wire feeder of the metal deposition apparatus. Energy is provided to melt at least the consumable wire electrode, via a power source of the metal deposition apparatus operatively connected to the wire feeder, during the depositing of the beaded weave pattern by forming an arc between the consumable wire electrode and the 3D part. In one embodiment, the method includes feeding a filler wire of the metal material toward the 3D part via a wire feeder of the metal deposition apparatus. Energy is provided to melt at least the filler wire during the depositing of the beaded weave pattern, via a power source of the metal deposition apparatus operatively connected to a laser of the metal deposition apparatus, by forming a laser beam between the laser and the 3D part. In one embodiment, the method includes feeding a filler wire of the metal material toward the 3D part via a wire feeder of the metal deposition apparatus. Energy is provided to melt at least the filler wire during the depositing of the beaded weave pattern, via a power source of the metal deposition apparatus operatively connected to a non-consumable electrode of the metal deposition apparatus, by forming an arc between the non-consumable electrode and the 3D part. In one embodiment, the method includes feeding a filler wire of the metal material toward the 3D part via a first wire feeder of the metal deposition apparatus, and feeding a consumable wire electrode of the metal material toward the 3D part via a second wire feeder of the metal deposition apparatus. Energy is provided to melt at least the consumable wire electrode and the filler wire during the depositing of the beaded weave pattern, via a power source of the metal deposition apparatus operatively connected to the second wire feeder, by forming an arc between the consumable wire electrode and the 3D part. In one embodiment, the method includes maintaining a substantially constant metal deposition rate of the metal material, during the depositing of the beaded weave pattern, under control of the computer control apparatus. In one embodiment, the method includes maintaining a substantially constant contact tip-to-work distance (CTWD), during the depositing of the beaded weave pattern, under control of the computer control apparatus. A wave shape of the beaded weave pattern may be, for example, one of a substantially sinusoidal shape, a substantially triangular shape, or a substantially rectangular shape, based on the planned build pattern, in accordance with various embodiments.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
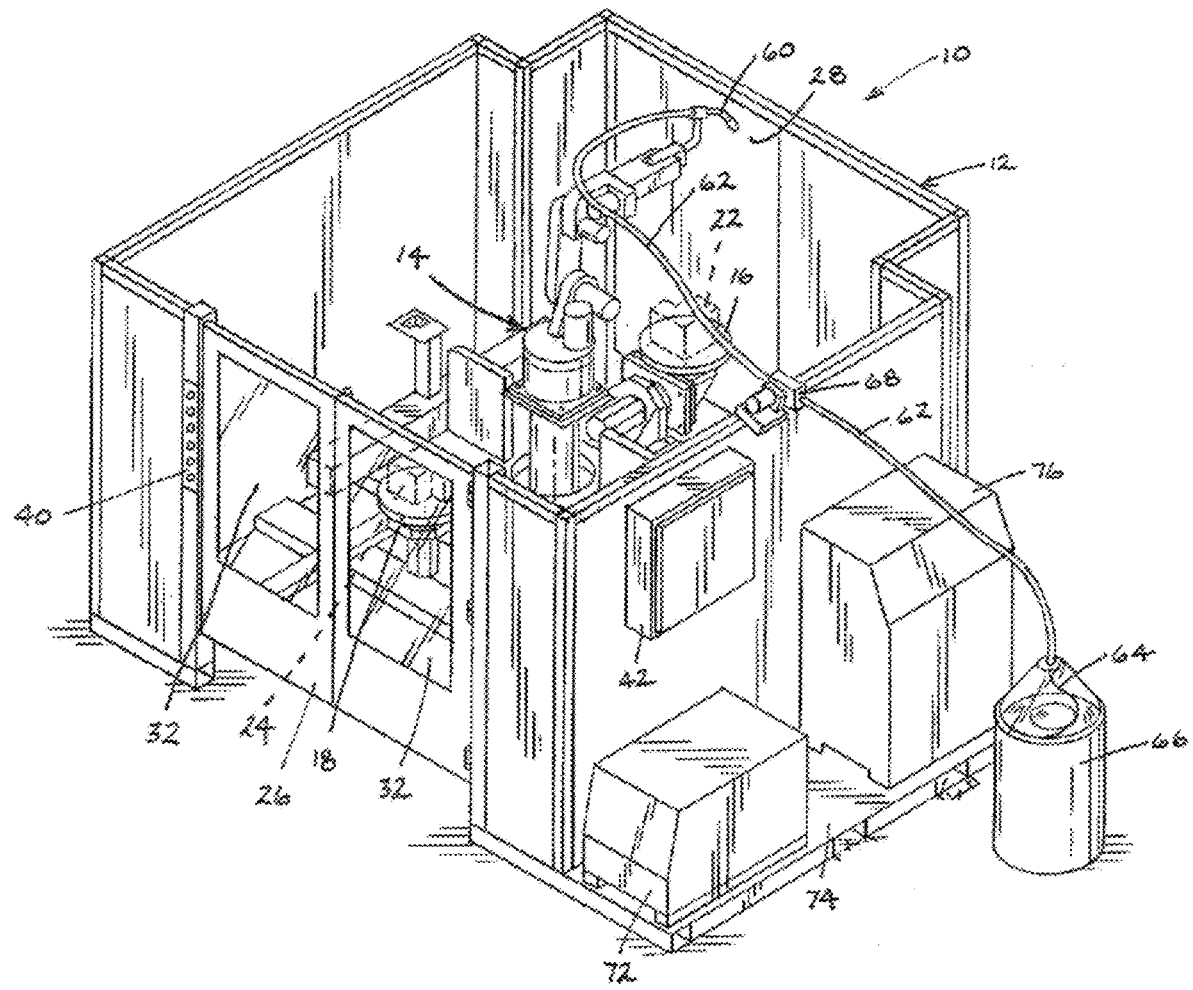
FIG. 1 illustrates one embodiment of an additive manufacturing system which includes a metal deposition apparatus.

As is generally known, additive manufacturing is a process in which a material is deposited onto a base/substrate or part (e.g., in layers) so as to create a desired manufactured product. Patterns of multiple layers of a three-dimensional (3D) part to be additively manufactured are represented and stored as digital data, in accordance with one embodiment. The digital data may be from a CAD model or from a scanned part, for example. In some applications the article of manufacture can be quite complex. However, known methods and systems used for filling in additive manufacturing tend to be slow and have limited performance. Embodiments of the present invention address the filling issues by providing systems and methods that deposit a dynamic beaded weave pattern during filling.

Embodiments of additive manufacturing systems and methods are disclosed. In one embodiment, an additive manufacturing system includes a computer control apparatus configured to access multiple planned build patterns stored as digital data and corresponding to multiple build layers of a three-dimensional (3D) part to be additively manufactured. The system also includes a metal deposition apparatus. The metal deposition apparatus is configured to deposit a beaded weave pattern of metal material along a length dimension of a build layer, of the multiple build layers of the 3D part, as a width of the build layer varies along the length dimension. The deposition is under the control of the computer control apparatus in accordance with a planned path of a planned build pattern of the multiple planned build patterns. A weave width, a weave frequency, and a weave dwell of the beaded weave pattern, and a travel speed of the metal deposition apparatus along the length dimension, are dynamically adjusted during deposition of the beaded weave pattern as the width varies along the length dimension. The dynamic adjustment is under the control of the computer control apparatus in accordance with the planned build pattern, resulting in a dynamically varying bead width of the beaded weave pattern. The planned build pattern and, therefore, the planned path and the dynamic adjustments are generated ahead of time as part of path planning development using path planning software.

Embodiments of a metal deposition apparatus may include, for example, at least one of a laser-based subsystem, a plasma based subsystem, an arc based subsystem, an electron beam based subsystem, or an electric resistance based subsystem, for example, to deposit a metal material by melting a metal wire. Furthermore, some embodiments of a metal deposition apparatus may include, for example, a wire delivery or feeding system to feed/deliver a consumable metal wire to additively manufacture a 3D part on a base. Also, some embodiments of a metal deposition apparatus may include, for example, kinematic control elements (e.g., robotics) or other types of control elements (e.g., optical control elements) to move a laser beam, a plasma beam, an electric arc, an electron beam, or a consumable metal wire with respect to a 3D part being additively manufactured on a base or a substrate.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 puts embodiments of the subject invention in context by illustrating one embodiment of an additive manufacturing system which includes a metal deposition apparatus. It is envisioned that the metal deposition apparatus may typically be used to help additively manufacture a part, layer-by-layer, by a welding process such as, for example, gas metal arc welding (GMAW), flux-cored arc welding (FCAW), or gas tungsten arc welding (GTAW). Other metal deposition processes are possible as well, in accordance with other embodiments, as discussed later herein.

Referring to FIG. 1, the additive manufacturing system 10 generally includes a frame 12, a robot 14 disposed within the frame, and first and second tables 16 and 18, respectively, also disposed within the frame. The additive manufacturing system 10 is useful for additively manufacturing parts (e.g., 22 and 24) in a manner that will be described in more detail below herein. In the depicted embodiment of FIG. 1, the frame 12 includes a plurality of side walls and doors to enclose the robot 14 and the tables 16 and 18. Even though a substantially rectangular configuration in plan view is shown, the frame 12, and the system 10, can take numerous configurations.

A front access door 26 mounts to the frame 12 to provide access to the interior of the frame. The front access door 26 can take a bi-fold configuration where the door includes two hinge sets: a first hinge set attaching the door 26 to the frame 12 and a second hinge set attaching one panel of the door to another panel. Nevertheless, the front access door 26 can take other configurations such as a sliding door or a swinging door. Similarly, a rear access door 28 also mounts to the frame 12. The rear access door 28 in the depicted embodiment also takes a bi-fold configuration; however, the rear access door can take other configurations such as those discussed with reference to the front access door 26. Windows 32 can be provided on either door (only depicted on front door 26). The windows can include a tinted safety screen, which is known in the art.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the additive manufacturing system 10 in a similar manner to controls used with known additive manufacturing systems.

In one embodiment, the robot 14 mounts on a pedestal that mounts on a support. The robot 14 in the depicted embodiment is centered with respect to the tables 16 and 18 and includes multiple axes of movement. If desired, the pedestal can rotate with respect to the support, similar to a turret. Accordingly, some sort of drive mechanism, e.g., a motor and transmission (not shown), can be housed in the pedestal and/or the support for rotating the robot 14.

In one embodiment, a deposition tool 60 is part of the metal deposition apparatus and attaches to a distal end of an arm of the robot 14. The deposition tool 60 may include, for example, a welding gun or torch having a contact tip, a laser device, or a non-consumable electrode device, in accordance with embodiments discussed later herein. The deposition tool 60 allows for deposition of metal material. In one embodiment, a flexible tube or conduit 62 attaches to the deposition tool 60. A consumable metal wire 64 (e.g., used as a wire electrode or a filler wire), which can be stored in a container 66, is delivered to the deposition tool 60 through the conduit 62. In one embodiment, a wire feeder 68 is part of the metal deposition apparatus and attaches to the frame 12 to facilitate the delivery of the consumable metal wire 64 to the deposition tool 60.

Even though the robot 14 is shown mounted to a base or lower portion of the frame 12, if desired, the robot 14 can mount to an upper structure of the frame and depend downwardly into the system 10. In one embodiment, a power supply 72 (power source) is part of the metal deposition apparatus for supporting an additive manufacturing operation and mounts to and rests on a platform 74 that is connected to and can be a part of the frame 12. In another embodiment, the power supply 72 may be implemented as two separate power supplies (e.g., one for powering a laser in the deposition tool 60 and another for heating the consumable metal wire 64 as it passes through the deposition tool 60). A computer control apparatus 76 communicates with and controls various portions of the additive manufacturing system 10 (including the robot 14), as discussed later herein, and rests and mounts on the platform 74.

Figure 2:
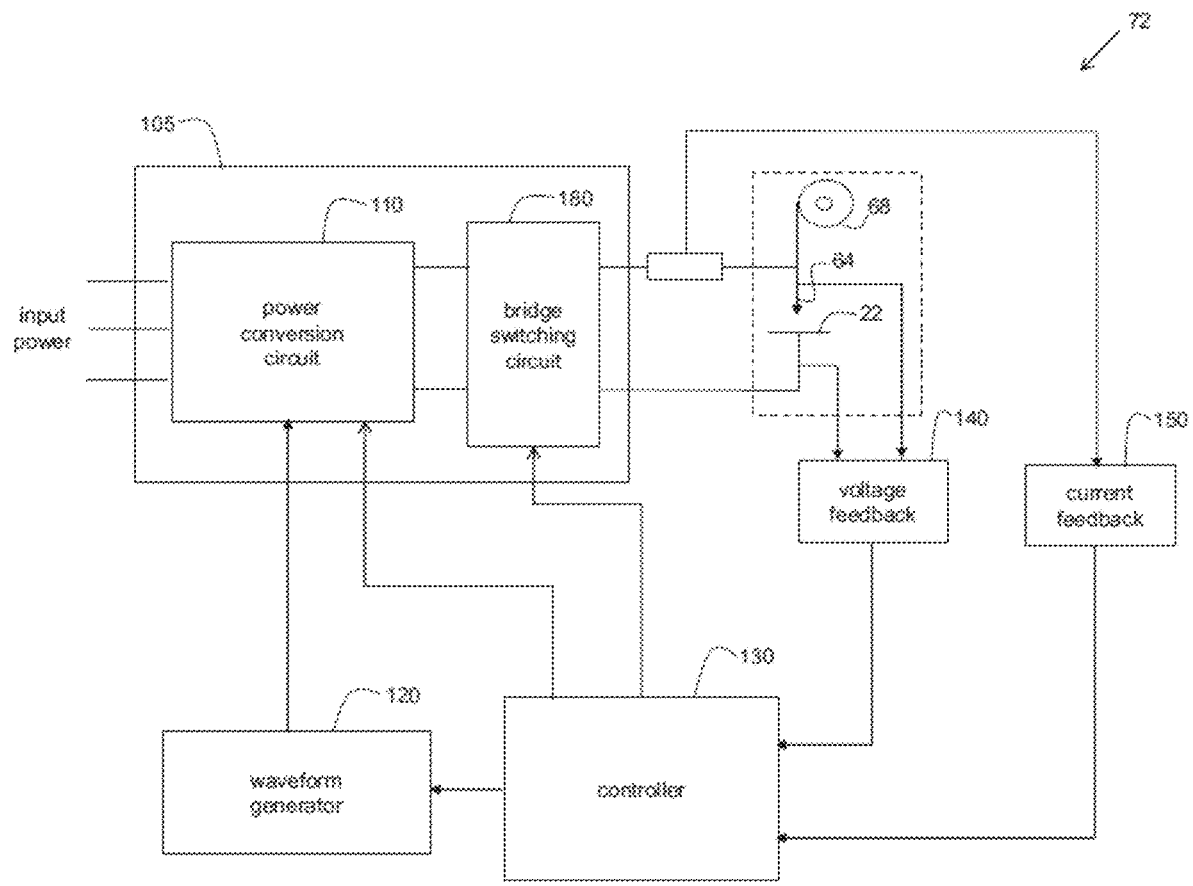
FIG. 2 illustrates a schematic block diagram of one embodiment of a power source of the additive manufacturing system of FIG. 1 operatively connected to a consumable wire electrode.

FIG. 2 illustrates a schematic block diagram of an exemplary embodiment of a power source 72 of the additive manufacturing system 10 of FIG. 1 operatively connected to a consumable wire electrode 64. The power source 72 includes a switching power supply 105 having a power conversion circuit 110 and a bridge switching circuit 180 providing welding output power between the wire 64 and the workpiece part 22 to melt the wire 64 during deposition by forming an arc between the wire 64 and the part 22. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. The power source 72 also includes a bridge switching circuit 180 that is operatively connected to the power conversion circuit 110 and is configured to switch a direction of the polarity of the welding output current (e.g., for AC operation).

The power source 72 further includes a waveform generator 120 and a controller 130. The waveform generator 120 generates welding waveforms at the command of the controller 130. A waveform generated by the waveform generator 120 modulates the output of the power conversion circuit 110 to produce the output current between the wire 64 and the workpiece part 22. The controller 130 also commands the switching of the bridge switching circuit 180 and may provide control commands to the power the conversion circuit 110.

In one embodiment, the power source 72 further includes a voltage feedback circuit 140 and a current feedback circuit 150 to monitor the output voltage and current between the wire 64 and the workpiece part 22 and provide the monitored voltage and current back to the controller 130. The feedback voltage and current may be used by the controller 130 to make decisions with respect to modifying the welding waveform generated by the waveform generator 120 and/or to make other decisions that affect operation of the power source 72, for example.

In accordance with one embodiment, the switching power supply 105, the waveform generator 120, the controller 130, the voltage feedback circuit 140, and the current feedback circuit 150 constitute the power source 72. The additive manufacturing system 10 also includes a wire feeder 68 that feeds the consumable metal wire 64 toward the workpiece part 22 through the deposition tool 60 at a selected wire feed speed (WFS), in accordance with one embodiment. The wire feeder 68, the consumable metal wire 64, and the workpiece part 22 are not part of the power source 72 but may be operatively connected to the power source 72 via one or more output cables, for example.

Figure 3:
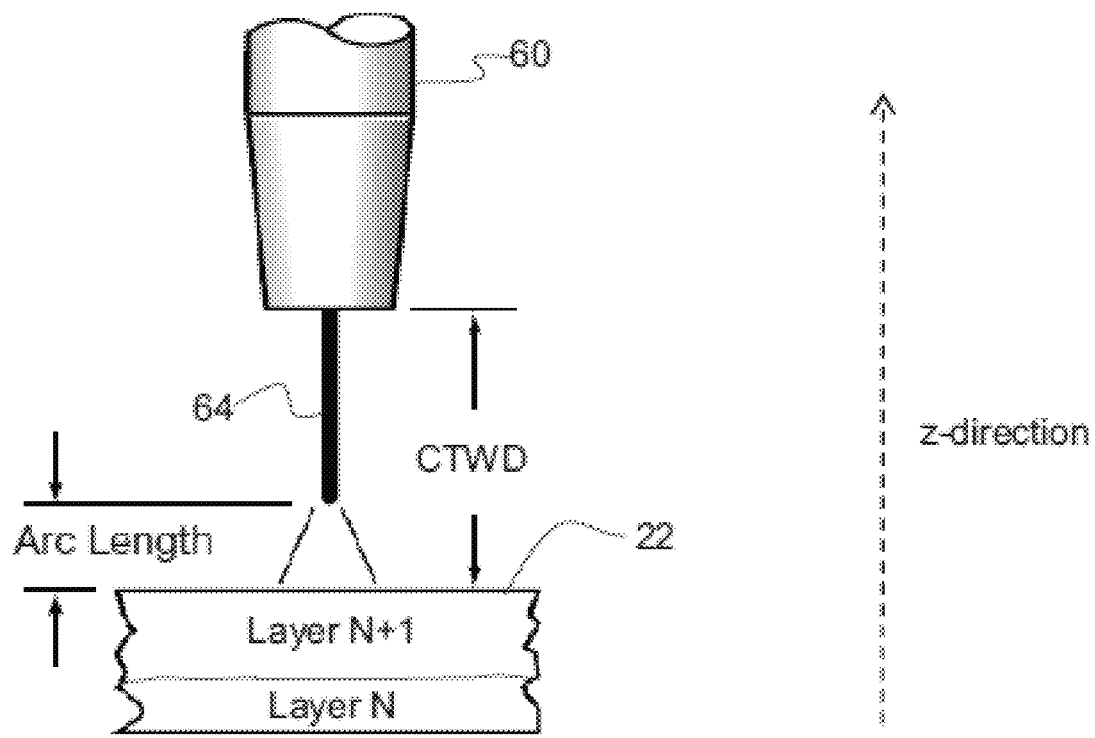
FIG. 3 illustrates a diagram showing one embodiment of generating an arc between a welding electrode and a build layer of a 3D part being additively manufactured.

FIG. 3 illustrates a diagram showing one embodiment of generating an arc between a consumable metal wire 64 (coming out of a deposition tool 60) and a 3D part 22 being additively manufactured. As seen in FIG. 3, a build layer N and a build layer N+1 of the part 22 have been deposited by melting the consumable metal wire 64 via the arc. An arc length and a contact tip-to-work distance (CTWD) are also shown in FIG. 3. In accordance with one embodiment, a substantially constant CTWD is controlled and maintained during deposition, as discussed later herein. U.S. Pat. No. 9,815,135, which is incorporated herein by reference in its entirety, discusses the concept of CTWD and how to determine and control CTWD.

In accordance with another embodiment, the deposition tool 60 includes a laser device and the power source 72 is configured to provide power (energy) to the laser device to form a laser beam to melt the consumable metal wire 64 (e.g., a filler wire) during deposition. In accordance with yet another embodiment, the deposition tool 60 includes a non-consumable electrode (e.g., a tungsten electrode) and the power source 72 is configured to provide power (energy) to melt the consumable metal wire 64 (e.g., a filler wire) during deposition by forming an arc between the non-consumable electrode and the part. In some embodiments, the consumable metal wire 64 is fed through the deposition tool 60, where the deposition tool 60 includes, for example, a contact tip, a laser device, or a non-consumable electrode. In other embodiments, the consumable metal wire 64 may not be fed through the deposition tool 60 having a contact tip, a laser device, or a non-consumable electrode. Instead, the consumable metal wire 64 may be fed from an adjacent position and toward an output of such a deposition tool 60, as discussed later herein with respect to at least FIGS. 11-13.

Figure 4:
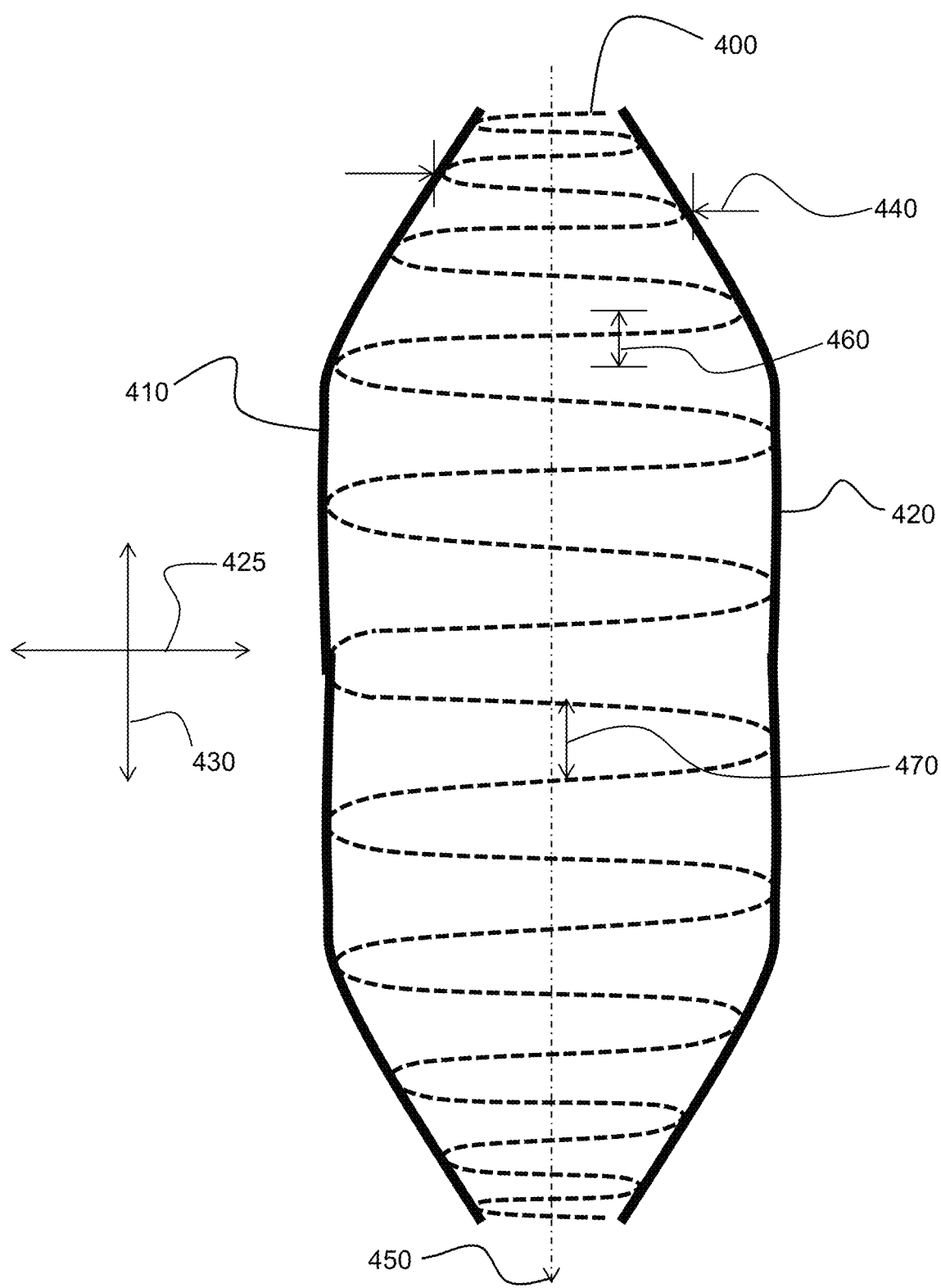
FIG. 4 illustrates a diagram showing one embodiment of a substantially sinusoidal beaded weave pattern to be deposited along the length of a build layer of a 3D part being additively manufactured.

FIG. 4 illustrates a diagram showing one embodiment of a substantially sinusoidal beaded weave pattern 400 to be deposited along the length of an example build layer of a 3D part being additively manufactured. In FIG. 4, the build layer is being viewed from above. FIG. 4 shows two previously deposited contours or boundaries 410 and 420 of the build layer. The width (in the width dimension 425) of the build layer varies along the length dimension 430 of the build layer. That is, following in the direction of the length dimension 430 from the top of FIG. 4 to the bottom of FIG. 4, the build layer starts out narrow, gradually widens, stays at a maximum width for a while, and then gradually narrows. Other build layers having other variations of width over a length dimension are possible as well.

The build layer between the contours 410 and 420 is filled in with a metal material as the beaded weave pattern 400 (e.g., starting at the top of FIG. 4 and ending at the bottom of FIG. 4). For example, referring to FIG. 1, the computer control apparatus 76 is configured to control the robot 14 to move the deposition tool 60 along a planned path that results in the deposited beaded weave pattern 400 to fill in the build layer between the contours 410 and 420. Referring to FIG.

4, during deposition, the weave width 440 and the weave frequency of the beaded weave pattern 400 vary as the width of the build layer varies along the length dimension 430. Also, a weave dwell of the beaded weave pattern 400 varies as the width of the build layer varies along the length dimension 430 during deposition. Furthermore, a travel speed of the deposition tool 60 (in a deposition travel direction 450 . . . e.g., from the top of FIG. 4 to the bottom of FIG. 4) varies as the width of the build layer varies along the length dimension 430 during deposition. The weave width, weave frequency, weave dwell, and travel speed are controlled by the computer control apparatus 76 during deposition, in accordance with a planned build pattern of the build layer.

Figure 5:
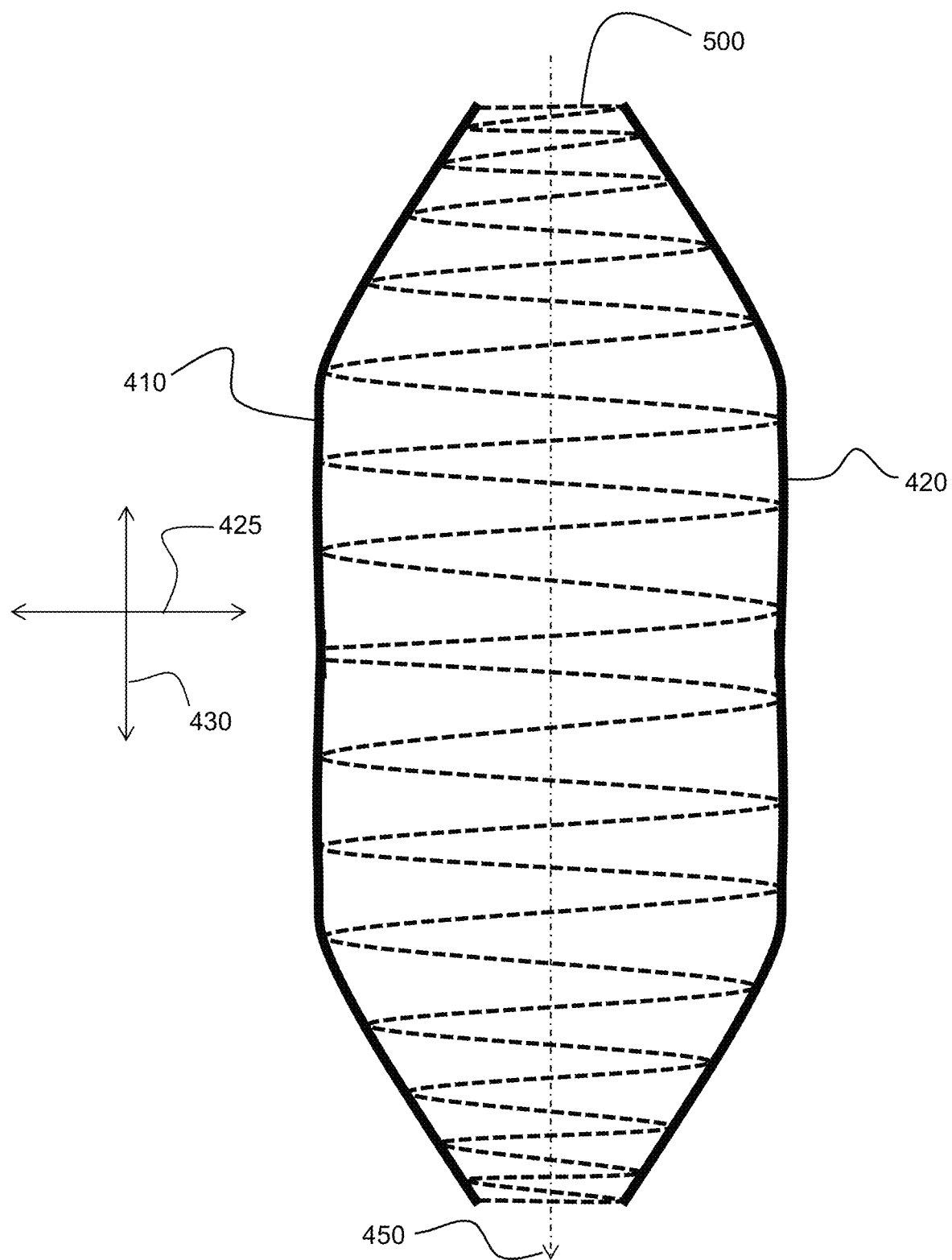
FIG. 5 illustrates a diagram showing one embodiment of a substantially triangular beaded weave pattern to be deposited along the length of a build layer of a 3D part being additively manufactured.
Figure 6:
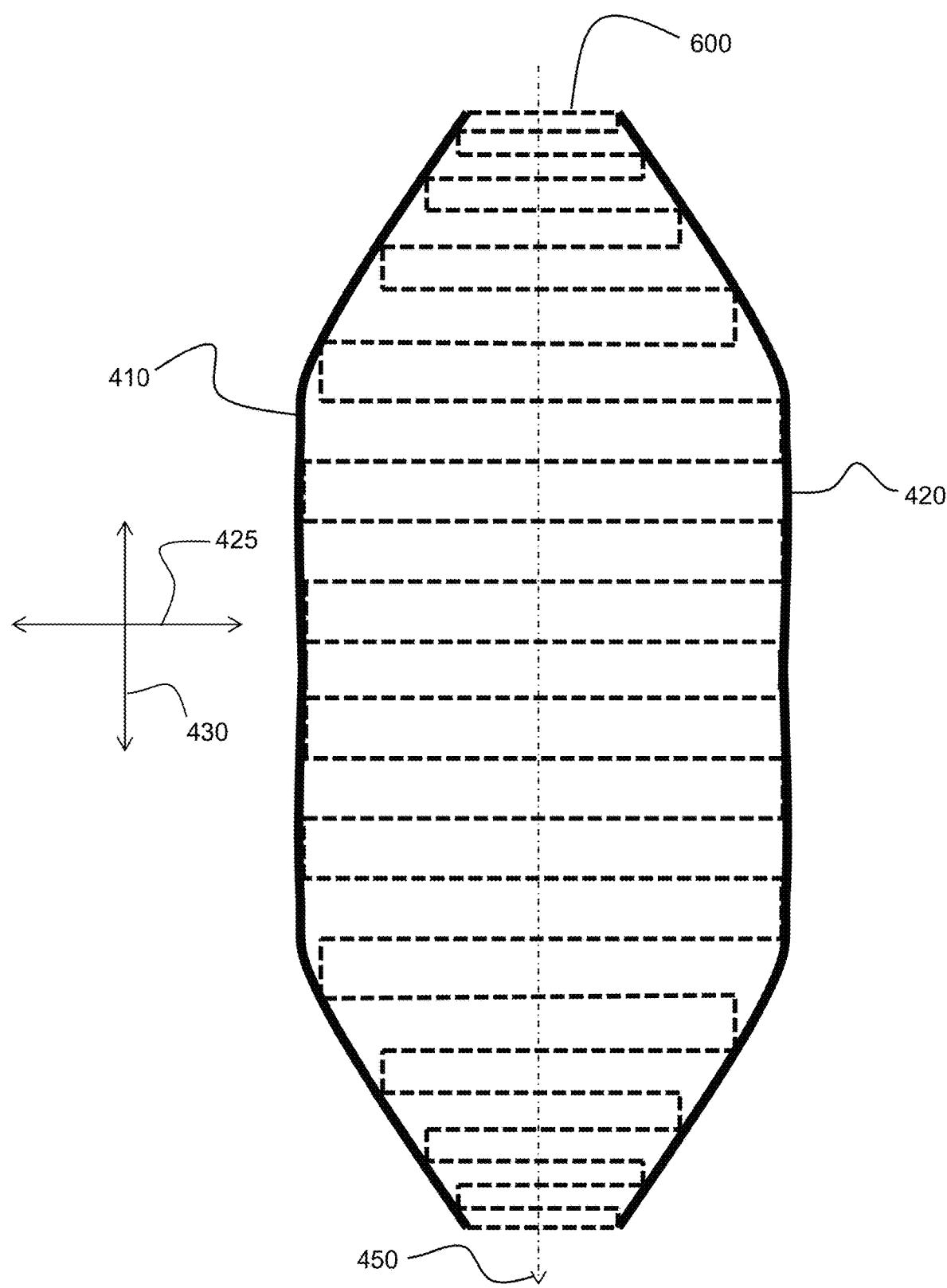
FIG. 6 illustrates a diagram showing one embodiment of a substantially rectangular beaded weave pattern to be deposited along the length of a build layer of a 3D part being additively manufactured.

Similarly to FIG. 4, FIG. 5 illustrates a diagram showing one embodiment of a substantially triangular beaded weave pattern 500 to be deposited along the length of a build layer of a 3D part being additively manufactured. Similarly to FIG. 4 and FIG. 5, FIG. 6 illustrates a diagram showing one embodiment of a substantially rectangular beaded weave pattern 600 to be deposited along the length of a build layer of a 3D part being additively manufactured. Other beaded weave patterns having varying weave widths and weave frequencies are possible as well, in accordance with other embodiments.

A bead is a metal deposition pass across a width of a build layer, and a beaded weave pattern is simply a series of metal deposition passes at locations along the planned path of a build layer for the beaded weave pattern. The deposited metal beads (passes) of the beaded weave pattern can have substantially similar or substantially different sizes (bead widths . . . e.g., see a bead width 460 in FIG. 4) and can be spaced similarly or differently from each other (e.g., see a bead spacing 470 in FIG. 4), depending on how the various parameters (weave width, weave frequency, weave dwell, and travel speed) are being dynamically adjusted. In accordance with one embodiment, the bead width 460 may range from 4 mm to 12 mm over the length of a build layer. The weave width 440 is effectively the peak-to-peak amplitude of the weave pattern along any portion of the deposition (e.g., see FIG. 4). The weave frequency is the number of weave cycles per unit time (or per unit length along the travel direction 450) and is the inverse of the weave wavelength. The travel speed in the travel direction 450 along the length dimension 430 of the build layer is essentially an effective instantaneous linear travel speed along the length dimension 430 at any point in time during deposition, even though the deposition tool is actually travelling along the planned path (e.g., a sinusoidal path, a triangular path, or a rectangular path) for the beaded weave pattern. The weave dwell is a pause time at either end of the weave pattern. For example, when weaving left/right (as in FIGS. 4-6), the weave dwell is a pause time at the end of the left movement and then again at the end of the right movement. For example, if a weave frequency is 1 Hz, and the weave dwell is 0.2 seconds, then the movement across the middle is the difference: i.e., 1 second minus 0.2 seconds (left side) minus 0.2 seconds (right side)=0.6 seconds total . . . then broken down into two travel movements (travel left and travel right over one cycle) results in move times of 0.3 seconds per left moving bead and 0.3 seconds per right moving bead. During the weave dwells, the process places heat at the edges of the beaded weave pattern. When a bead is placed next to another bead, the weave dwell is set to allow metal to flow into the corner of the earlier bead and the previous layer, without bridging, which would leave a void.

Figure 7:
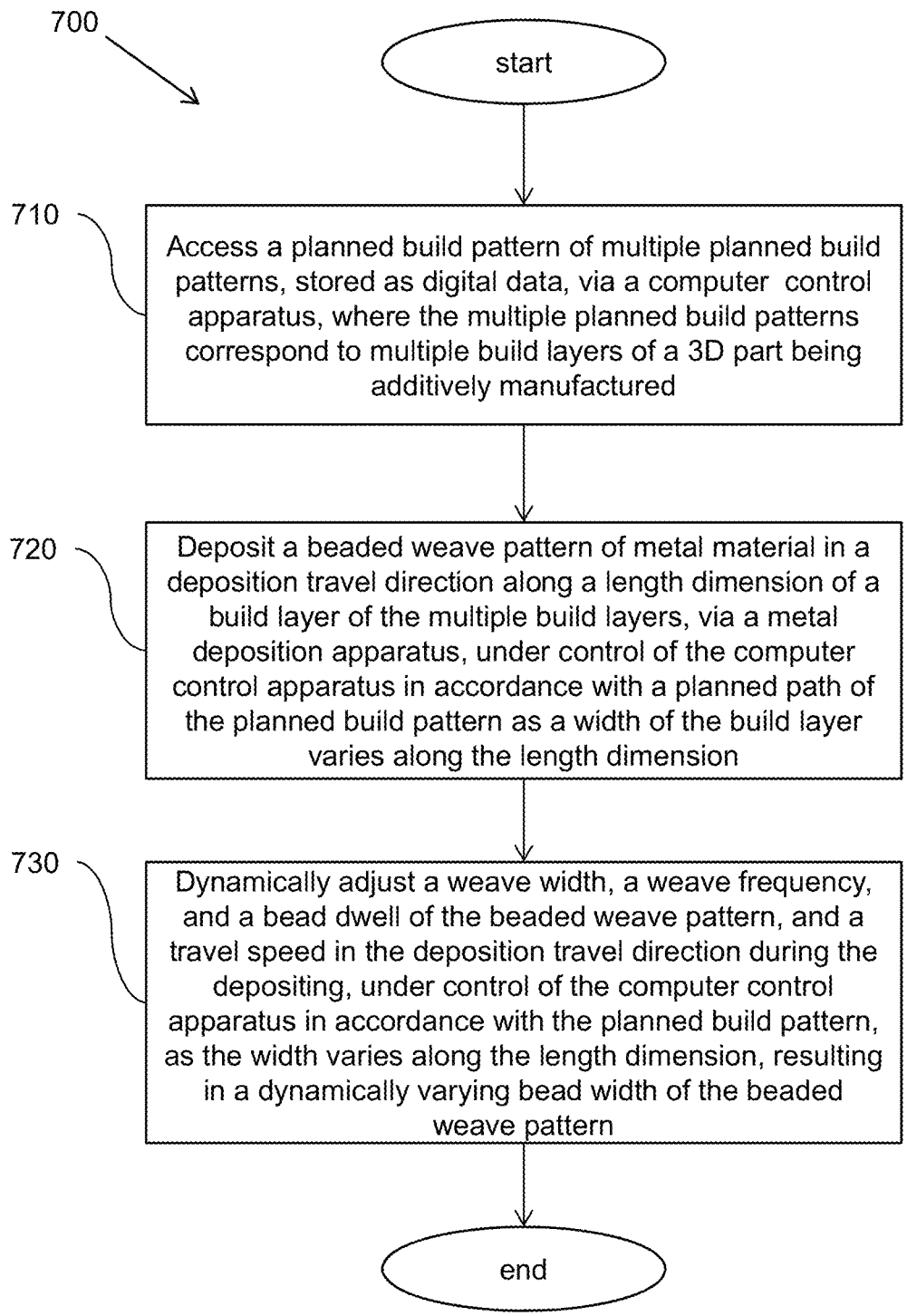
FIG. 7 illustrates a flowchart of one embodiment of a method of filling a build layer of a 3D part being additively manufactured.

FIG. 7 illustrates a flowchart of one embodiment of a method 700 of filling a build layer of a 3D part being additively manufactured. At block 710 of the method 700, a planned build pattern is accessed via a computer control apparatus (e.g., the computer control apparatus 76 of FIG. 1). The planned build pattern is one of multiple planned build patterns stored as digital data (e.g., in a storage subsystem of the computer control apparatus 76 . . . e.g., see FIG. 15). The multiple planned build patterns correspond to multiple build layers of a three-dimensional (3D) part (e.g., 3D part 22 of FIG. 1) being additively manufactured.

At block 720, a beaded weave pattern of metal material (e.g., beaded weave pattern 400 of FIG. 4) is deposited in a deposition travel direction 450 along a length dimension of a build layer of the multiple build layers. Deposition is accomplished via a metal deposition apparatus (e.g., the power supply 72, the wire feeder 68, and the deposition tool 60 of FIG. 1), under the control of the computer control apparatus (e.g., the computer control apparatus 76 of FIG. 1), in accordance with a planned path of the planned build pattern as a width of the build layer varies along the length dimension.

At block 730, a weave width, a weave frequency, and a weave dwell of the beaded weave pattern are dynamically adjusted, along with a travel speed in the deposition travel direction 450, during deposition. The dynamic adjustments are performed under the control of the computer control apparatus (e.g., the computer control apparatus 76 of FIG. 1), in accordance with the planned build pattern, as the width varies along the length dimension. The result is a dynamically varying bead width of the beaded weave pattern (e.g., the beaded weave pattern 400 of FIG. 4). In accordance with one embodiment, since the planned build pattern is determined ahead of time during path planning development, the dynamic adjustments to be made are predetermined. That is, the adjustments of the weave width, the weave frequency, the weave dwell, and the travel speed are not determined on-the-fly during an infilling process.

In accordance with one embodiment, the weave width, the weave frequency, the weave dwell, and the travel speed are dynamically adjusted during deposition in the method 700 to provide proper infilling of the build layer. The dynamic adjustments allow the bead width to widen or narrow to provide proper infilling and to allow maintenance of a substantially constant deposition rate of the metal material. In general, as the fill area becomes wider, travel is slowed, the weave width is opened up, and the bead gets wider (and vice versa). In accordance with one embodiment, as the width of the build layer widens along the length of the build layer during deposition, the travel speed is reduced, the weave width is increased, the weave frequency is decreased (i.e., the weave wavelength is increased), and the weave dwell is increased. In accordance with one embodiment, as the width of the build layer narrows along the length of the build layer during deposition, the travel speed is increased, the weave width is decreased, the weave frequency is increased (i.e., the weave wavelength is decreased), and the weave dwell is decreased. Again, the dynamic increasing and decreasing of the weave parameters and the travel speed are determined ahead of time, as part of path planning development, and are not dynamically determined on-the-fly in real time, in accordance with one embodiment. However, there may be other embodiments in which on-the-fly, real time dynamic adjustments are performed.

Furthermore, in accordance with one embodiment, a substantially constant contact tip-to-work distance (CTWD) is maintained, during the depositing of the beaded weave pattern, under control of the computer control apparatus. For example, U.S. Published Patent Application No. 2017/0252847 A1, which is incorporated herein by reference, discusses ways of controlling CTWD. Even though, during infill deposition, the travel speed and the weave parameters are dynamically changing, which may affect CTWD, the CTWD control process discussed in U.S. Published Patent Application No. 2017/0252847 A1 can be used to keep CTWD substantially constant, thus compensating for CTWD changes due to the dynamic deposition infill process. Also, in one embodiment, a substantially constant wire feed speed (WFS) is maintained, during the depositing of the beaded weave pattern, under control of the computer control apparatus. In another embodiment, the WFS may also be dynamically varied.

In some embodiments, not all of the parameters (travel speed and weave parameters) have to change at the same time during deposition of the beaded weave pattern. For example, depending on the shape of the infill area of a build layer, all of the parameters (travel speed, weave width, weave frequency, weave dwell) may be changed, or only some of the parameters (e.g., weave width and weave dwell) may be changed. The relationship of how the parameters dynamically change with respect to each other is determined ahead of time during path planning development for a build layer, to result in efficient and effective infill deposition of the build layer.

In accordance with one embodiment, during path planning development, as the width of the build layer changes, the path planning software determines an area that needs to be filled across the current bead pass and dynamically adjusts the parameters (travel speed and weave parameters) for proper infilling of that area. Slicing software of G-code of the path planning software is involved with determining the area. The path planning software "knows" the location of the current bead pass on the build layer based on a CAD model of the 3D part to be additively manufactured, or digital data derived from scanning the 3D part.

Figure 8:
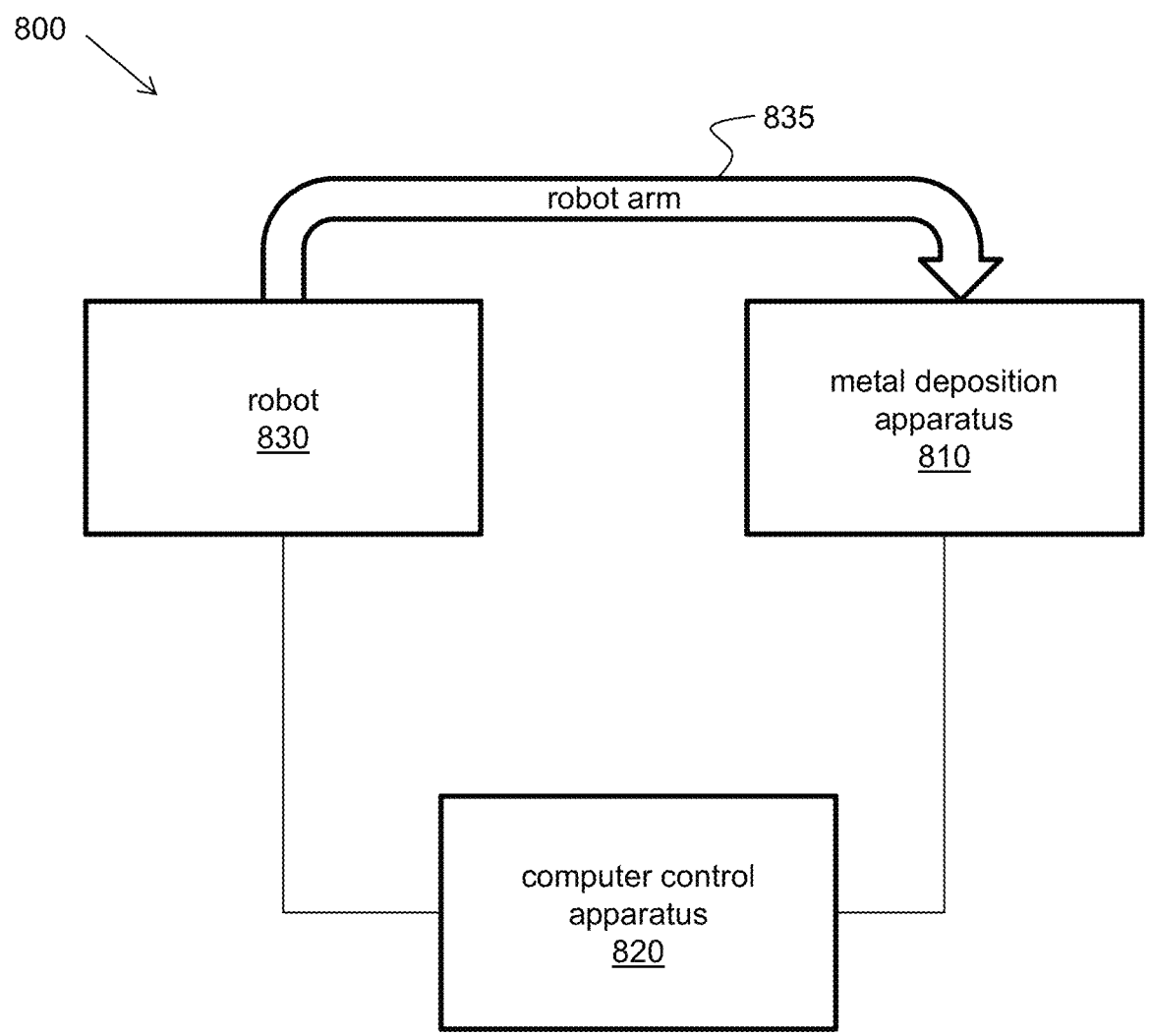
FIG. 8 illustrates a system block diagram of one embodiment of an additive manufacturing system having a metal deposition apparatus, a computer control apparatus, and a robot having a robot arm.

FIG. 8 illustrates a system block diagram of one embodiment of an additive manufacturing system 800 having a metal deposition apparatus 810, a computer control apparatus 820, and a robot 830 having a robot arm 835. The metal deposition apparatus 810 is configured to deposit molten metal material during an additive manufacturing process to form a part. The computer control apparatus 820 is operatively coupled to the metal deposition apparatus 810 and the robot 830. That is, in the embodiment of FIG. 8, the computer control apparatus 820 is configured to control various aspects of the metal deposition apparatus 810 (e.g., wire feeding, output power or energy) and to serve as a motion controller for the robot 830. In accordance with other embodiments, the computer control apparatus 820 may include two or more controllers (e.g., a first controller to control the metal deposition apparatus 810 and a second controller to control the robot 830). In one embodiment, the robot arm 835 is coupled to the metal deposition apparatus 810 (or to at least a portion of the metal deposition apparatus 810 such as a deposition tool) such that the robot 830 can move the metal deposition apparatus 810 in space, via the arm 835, relative to a base or substrate under control of the computer control apparatus 820. In another embodiment, the robot arm 835 is coupled to the base or substrate such that the robot 830 can move the base or substrate in space, via the arm 835, relative to the metal deposition apparatus 810.

In accordance with one embodiment, the computer control apparatus 820 commands the metal deposition apparatus 810 to deposit a molten metal material on a base (substrate) during a contour deposition phase of an additive manufacturing process to form a contour of a part. The computer control apparatus 820 then commands the metal deposition apparatus 810 to deposit the metal material on the base during an infill pattern deposition phase of the additive manufacturing process to form a beaded weave pattern within a region outlined by the contour of the part. The deposition rate of the contour deposition phase is less than a deposition rate of the infill pattern deposition phase, in accordance with one embodiment, allowing the contour to be deposited more accurately and more precisely than the infill pattern. As the additive manufacturing process continues to build successive layers of the part, the metal material is deposited on a previous layer of the contour and infill pattern, for example.

Figure 9:
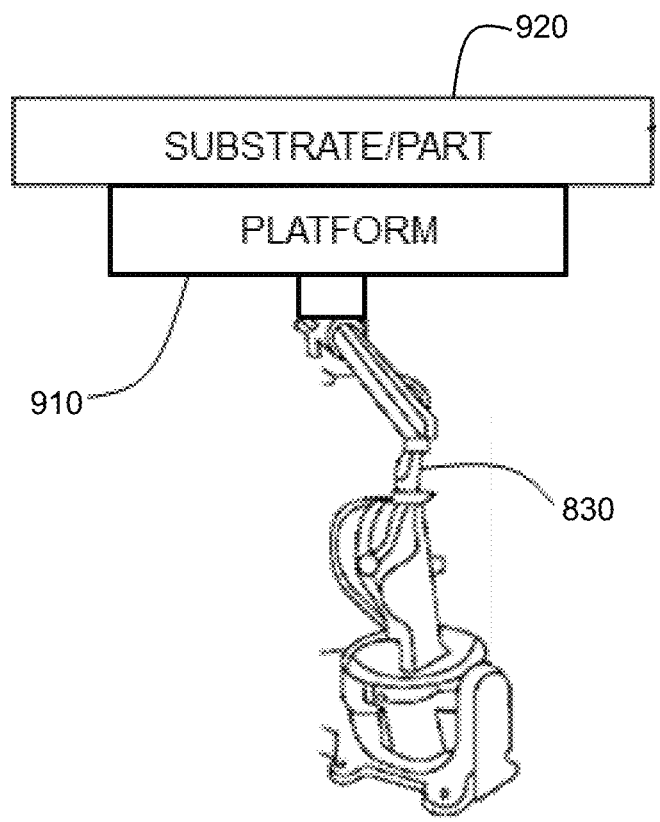
FIG. 9 illustrates a portion of an alternative embodiment of the additive manufacturing system of FIG. 8, where the robot is operatively connected to a platform holding a 3D part or substrate, instead of being connected to the metal deposition apparatus.

FIG. 9 illustrates a portion of an alternative embodiment of the additive manufacturing system 800 of FIG. 8, where the robot 830 is operatively connected to a platform 910 holding a 3D part or substrate 920 instead of being connected to the metal deposition apparatus 810. The metal deposition apparatus 810 and the robot 830 may be of the types shown in FIG. 1 and FIG. 9, for example, in accordance with certain embodiments. Other types of robots and metal deposition apparatuses are possible as well, in accordance with other various embodiments. For example, FIGS. 10-14 show various embodiments of metal deposition apparatuses as discussed below herein.

Figure 10:
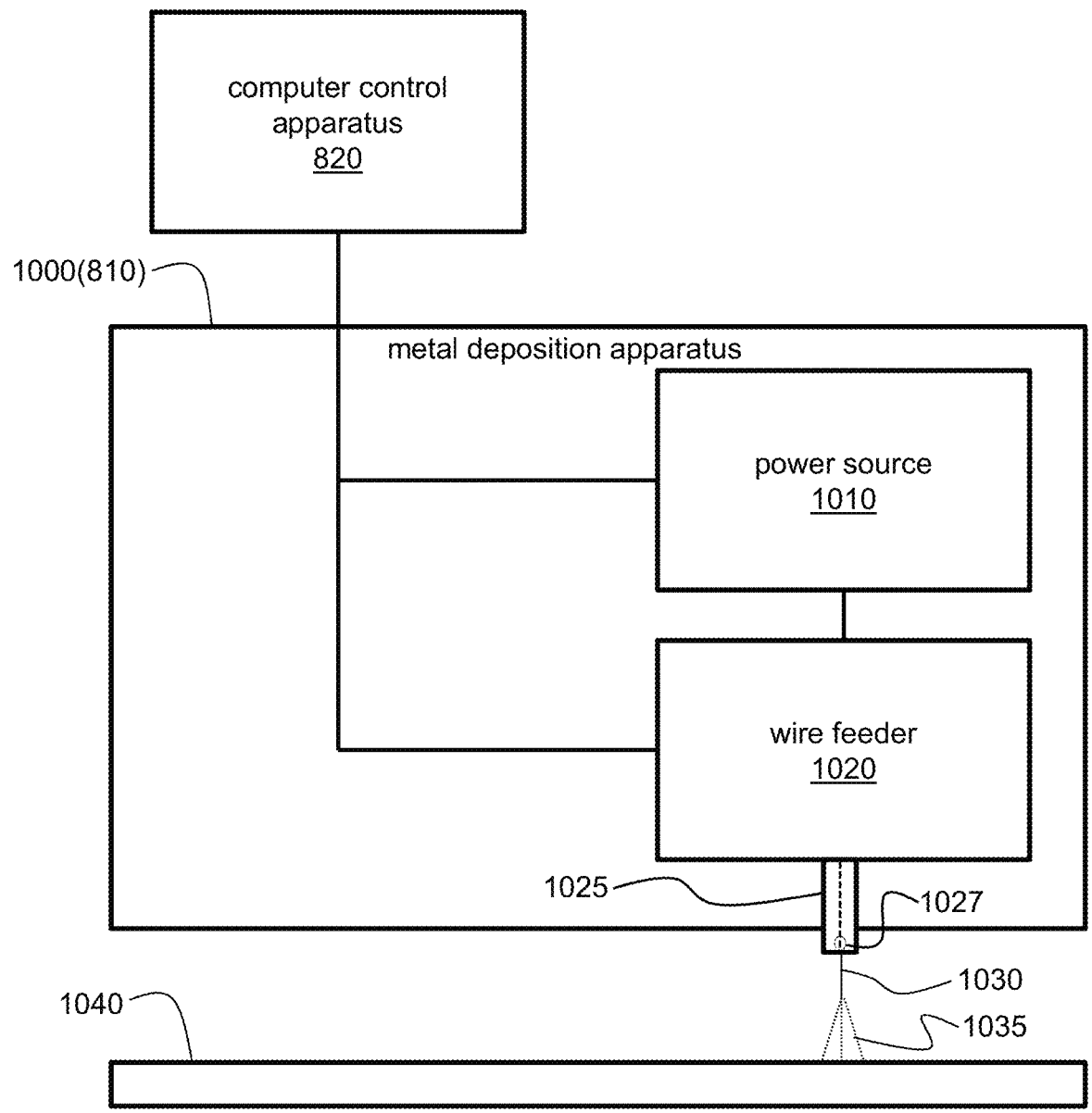
FIG. 10 illustrates a system block diagram of one embodiment of the metal deposition apparatus of FIG. 8 that is consumable electrode based.

FIG. 10 illustrates a system block diagram of one embodiment 1000 of the metal deposition apparatus 810 of FIG. 8 that is consumable electrode based and which includes a power source 1010 and a wire feeder 1020 that are controlled by the computer control apparatus 820 of FIG. 8. The metal deposition apparatus 1000 also includes a deposition tool 1025 (e.g., a welding torch or gun having a contact tip 1027). The metal deposition apparatus 1000 may have elements and/or combinations of elements that are similar that of FIGS. 1-2, for example, in accordance with certain embodiments. The wire feeder 1020 is configured to feed a consumable wire electrode 1030 of a metal material through the deposition tool 1025 and toward a base or part 1040. The power source 1010 and the deposition tool 1025 are operatively connected to the wire feeder 1020. The power source 1010 and the wire feeder 1020 are configured to provide energy via the consumable wire electrode 1030 (forming an electric arc 1035 between the electrode 1030 and the base/part 1040) to melt the consumable wire electrode 1030 (and possibly part of the base 1040) during an additive manufacturing process. Electrical contact to the consumable wire electrode 1030 is made via the contact tip 1027 of the deposition tool 1025. The robot 830 of FIG. 8 may move the metal deposition apparatus 1000 (or just the deposition tool 1025), or the base/part 1040 to deposit a beaded weave pattern under the control of the computer control apparatus 820 as discussed herein. Again, as the additive manufacturing process continues to build successive build layers of the part, the metal material is deposited on a previous build layer, for example, in a similar manner.

Figure 11:
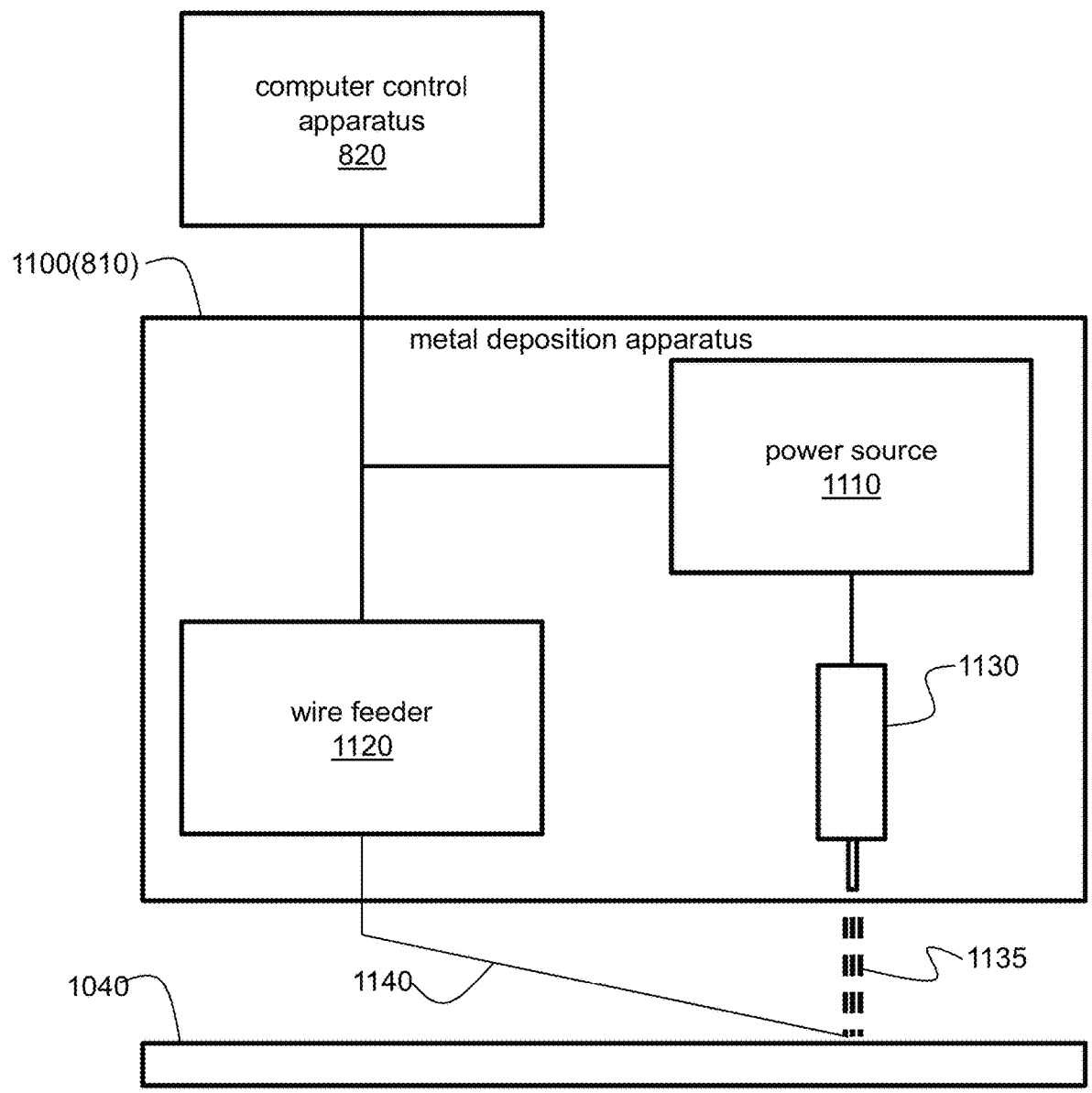
FIG. 11 illustrates a system block diagram of one embodiment of the metal deposition apparatus of FIG. 8 that is laser based.

FIG. 11 illustrates a system block diagram of one embodiment 1100 of the metal deposition apparatus 810 of FIG. 8 that is laser based and which includes a power source 1110, a wire feeder 1120, and a laser device 1130 that are controlled by the computer control apparatus 820 of FIG. 8. The metal deposition apparatus 1100 is configured to deposit a metal filler wire during an additive manufacturing process. In one embodiment, the laser device 1130 and the wire feeder 1120 may constitute a deposition tool. In another embodiment, the laser device 1130 may constitute a deposition tool. The metal deposition apparatus 1100 may have elements and/or combinations of elements that are similar that of FIGS. 1-2, for example, in accordance with certain embodiments. The wire feeder 1120 is configured to feed a filler wire 1140 of a metal material toward a base or part 1040. The embodiment of the metal deposition apparatus 1100 of FIG. 11 also includes a power source 1110 and a laser device 1130 operatively connected to the power source 1110. The power source 1110 and the laser device 1130 are configured to provide energy (in the form of a laser beam 1135) to melt the filler wire 1140 (and possibly part of the base or part 1040) during an additive manufacturing process. The robot 830 of FIG. 8 may move the metal deposition apparatus 1100 (or just the laser device 1130), or the base/part 1040 to deposit a beaded weave pattern under the control of the computer control apparatus 820 as discussed herein. Again, as the additive manufacturing process continues to build successive build layers of the part, the metal material is deposited on a previous build layer, for example, in a similar manner.

Figure 12:
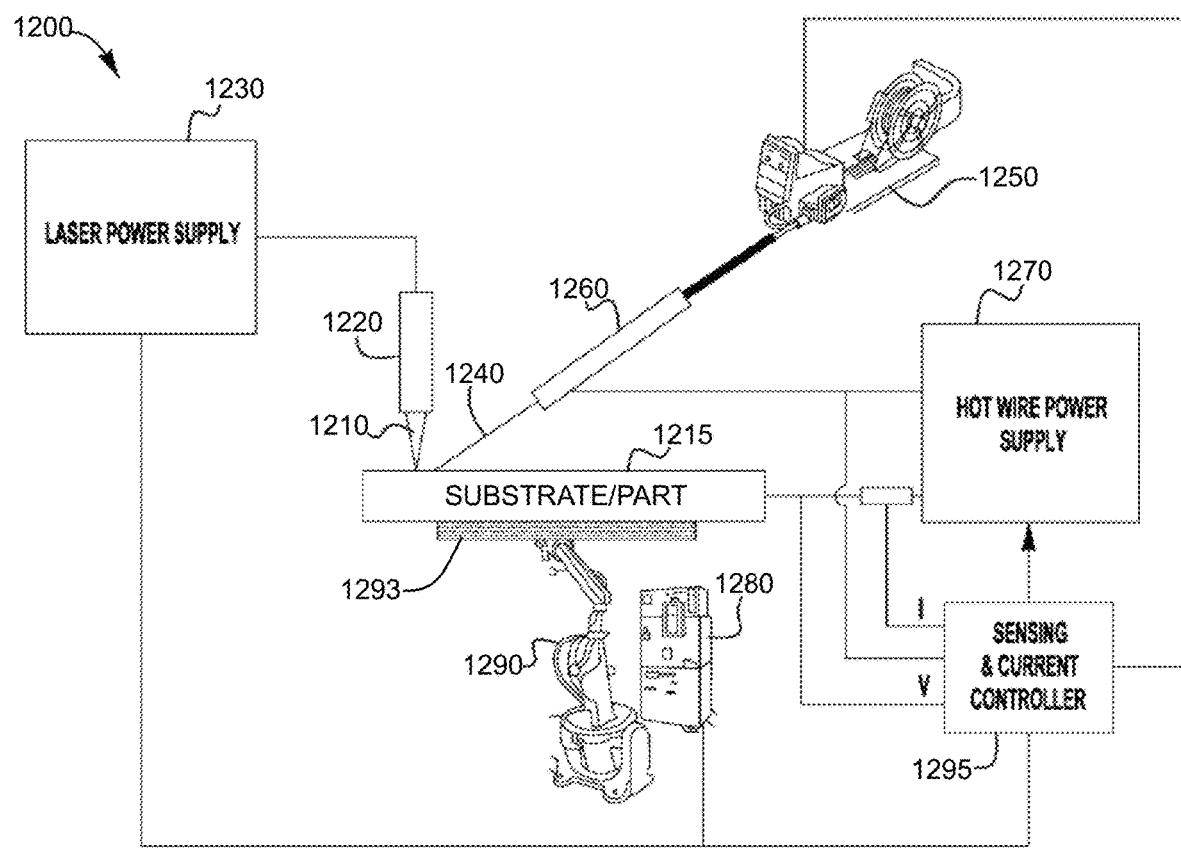
FIG. 12 illustrates a system block diagram of one embodiment, having similarities to FIG. 11, of an additive manufacturing system having a metal deposition apparatus configured as a laser hot wire (LHW) system.

Similar to FIG. 11, in accordance with one embodiment, an additive manufacturing system having a metal deposition apparatus may be configured as a laser hot wire (LHW) system 1200 as in FIG. 12. The system 1200 of FIG. 12 includes an exemplary embodiment of a combination filler wire feeder and an energy source. In particular, the system 1200 includes a laser subsystem capable of focusing a laser beam 1210 onto a base/substrate or part 1215 to heat the base/substrate or part 1215. In one embodiment, the laser subsystem is a high intensity energy source. The laser subsystem can be any type of high energy laser source, including but not limited to carbon dioxide, Nd:YAG, Yb-disk, YB-fiber, fiber delivered, or direct diode laser systems. In another embodiment, the laser subsystem is a low intensity energy source (e.g., to soften or minimally melt a metal material).

The following will repeatedly refer to the laser system, the beam, and the power supply. However, it should be understood that this reference is exemplary, as any energy source may be used. For example, a high intensity energy source can provide at least 500 W/cm$^2$. The laser subsystem includes a laser device 1220 and a laser power supply 1230 operatively connected to each other. The laser power supply 1230 provides power to operate the laser device 1220.

In one embodiment, the system 1200 also includes a hot filler wire feeder subsystem capable of providing at least one resistive filler wire 1240 to make contact with the base/substrate or part 1215 in the vicinity of the laser beam 1210. The wire feeder subsystem includes a filler wire feeder 1250, a contact tube 1260, and a power supply 1270. During operation, the filler wire 1240 is resistance-heated by electrical current from the power supply 1270 which is operatively connected between the contact tube 1260 and the base/substrate or part 1215. In accordance with one embodiment, the power supply 1270 is a pulsed direct current (DC) power supply, although alternating current (AC) or other types of power supplies are possible as well. The wire 1240 is fed from the filler wire feeder 1250 through the contact tube 1260 toward the base/substrate or part 1215 and extends beyond the tube 1260. The extension portion of the wire 1240 is resistance-heated such that the extension portion approaches or reaches the melting point before contacting the base/substrate or part 1215. The laser beam 1210 may serve to melt some of the base metal of the base/substrate or part 1215 to form a puddle and/or can also be used to melt the wire 1240 onto the base/substrate or part 1215. The power supply 1270 provides energy needed to resistance-melt the filler wire 1240. In some embodiments the power supply 1270 provides all of the energy needed while in other embodiments the laser or other energy heat source can provide some of the energy.

The system 1200 further includes a motion control subsystem capable of moving the laser beam 1210 (energy source) and the resistive filler wire 1240 in a same controlled direction (e.g., a beaded weave pattern) along the base/substrate or part 1215 (at least in a relative sense) such that the laser beam 1210 and the resistive filler wire 1240 remain in a fixed relation to each other. For example, in one embodiment, the resistive filter wire 1240 may be fed through a deposition tool housing the laser device 1220 and the contact tube 1260. According to various embodiments, the relative motion between the base/substrate or part 1215 and the laser/wire combination may be achieved by actually moving the base/substrate or part 1215 or by moving a deposition tool having, for example, the laser device 1220 and at least a portion of the wire feeder subsystem (e.g., the contact tube 1260). For example, the laser device 1220 and the contact tube 1260 may be integrated into a single deposition tool. The deposition tool may be moved along the base/substrate or part 1215 via a motion control subsystem operatively connected to the deposition tool.

In FIG. 12, the motion control subsystem includes a computer control apparatus 1280 operatively connected to a robot 1290 having a platform 1293 (e.g., a rotatable platform and/or a translatable platform). The computer control apparatus 1280 controls the motion of the robot 1290. The robot 1290 is operatively connected (e.g., mechanically secured) to the base/substrate or part 1215 via the platform 1293 to move the base/substrate or part 1215 in, for example, a beaded weave pattern such that the laser beam 1210 and the wire 1240 effectively travel along the base/substrate or part 1215. The robot 1290 driving the platform 1293 may be driven electrically, pneumatically, or hydraulically, in accordance with various embodiments. In accordance with one embodiment, the motion control subsystem, including the computer control apparatus 1280 and the robot 1290 are a separate part of an additive manufacturing system and are not part of the metal deposition apparatus.

The additive manufacturing system 1200 further includes a sensing and current control subsystem 1295 which is operatively connected to the base/substrate or part 1215 and the contact tube 1260 (i.e., effectively connected to the output of the power supply 1270) and is capable of measuring a potential difference (i.e., a voltage V) between and a current (I) through the base/substrate or part 1215 and the wire 1240. The sensing and current control subsystem 1295 may further be capable of calculating a resistance value (R=V/I) and/or a power value (P=V*I) from the measured voltage and current. In general, when the wire 1240 is in contact with the base/substrate or part 1215, the potential difference between the wire 1240 and the base/substrate or part 1215 is zero volts (or very nearly zero volts). As a result, the sensing and current control subsystem 1295 is capable of sensing when the resistive filler wire 1240 is in contact with the base/substrate or part 1215 and is operatively connected to the power supply 1270 to be further capable of controlling the flow of current through the resistive filler wire 1240 in response to the sensing. In accordance with another embodiment, the sensing and current controller 1295 may be an integral part of the power supply 1270.

Figure 13:
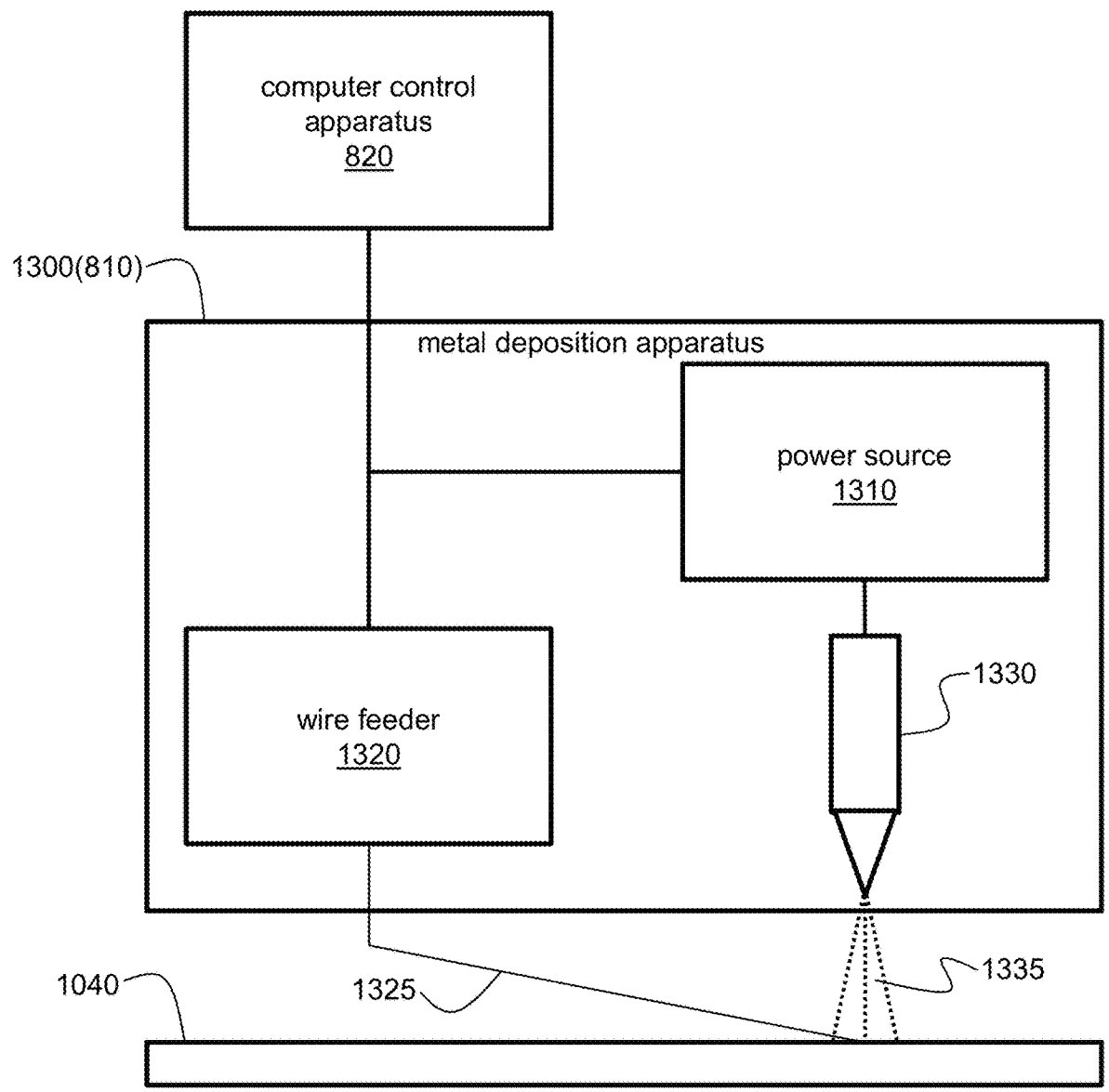
FIG. 13 illustrates a system block diagram of one embodiment of the metal deposition apparatus of FIG. 8 that is non-consumable electrode based.

FIG. 13 illustrates a system block diagram of one embodiment 1300 of the metal deposition apparatus 810 of FIG. 8 that is non-consumable electrode based and which includes a power source 1310, a wire feeder 1320, and a non-consumable electrode 1330 (e.g., a tungsten electrode) that are at least partially controlled by the computer control apparatus 820 of FIG. 8. The metal deposition apparatus 1300 is configured to deposit a metal filler wire during an additive manufacturing process. The metal deposition apparatus 1300 may have elements and/or combinations of elements that are similar that of FIGS. 1-2, for example, in accordance with certain embodiments. The wire feeder 1320 is configured to feed a filler wire 1325 of a metal material toward a base 1040. The non-consumable electrode 1330 is operatively connected to the power source 1310. The power source 1310 and the non-consumable electrode 1330 are configured to provide energy (in the form of a plasma beam or arc 1335) to melt the filler wire 1325 (and possibly part of the base or part 1040) during an additive manufacturing process to deposit, for example, a beaded weave pattern. The computer control apparatus 820 is operatively connected to the wire feeder 1320 and the power source 1310 to provide at least partial control thereof. Again, as the additive manufacturing process continues to build successive build layers of the part, the metal material is deposited on a previous build layer, for example, in a similar manner.

Figure 14:
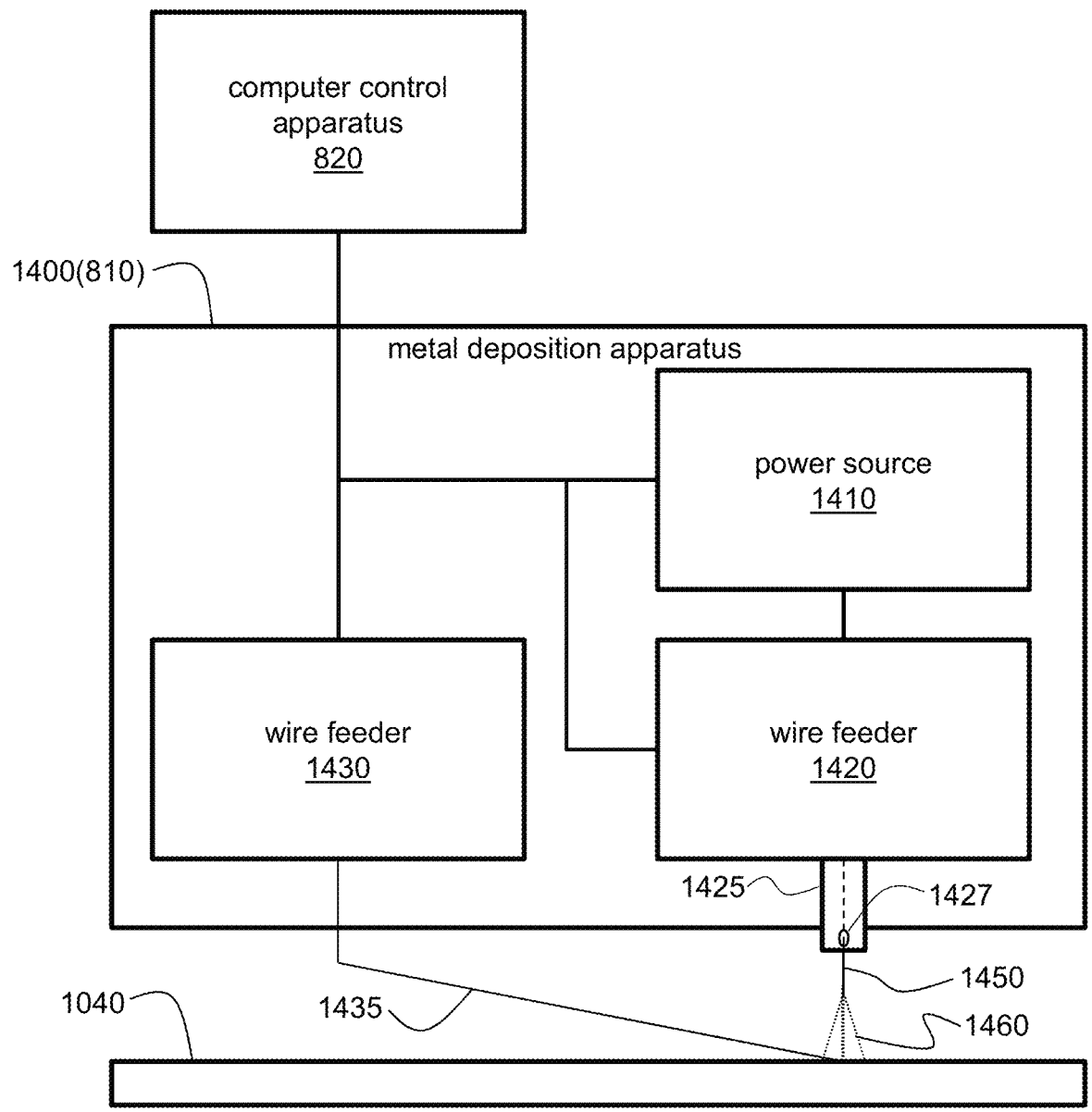
FIG. 14 illustrates a system block diagram of one embodiment of the metal deposition apparatus of FIG. 8 that is both consumable electrode based and filler wire based.

FIG. 14 illustrates a system block diagram of one embodiment 1400 of the metal deposition apparatus 810 of FIG. 8 that is both consumable electrode based and filler wire based, and which includes a power source 1410, a first wire feeder 1420, and a second wire feeder 1430 that are controlled, at least partially, by the computer control apparatus 820 of FIG. 8. The metal deposition apparatus 1400 also includes a deposition tool 1425 (e.g., a welding torch or gun having a contact tip 1427). The metal deposition apparatus 1400 may have elements and/or combinations of elements that are similar that of FIGS. 1-2, for example, in accordance with certain embodiments. The second wire feeder 1430 is configured to feed a filler wire 1435 of a metal material toward a base or part 1040. The first wire feeder 1420 is operatively connected to the power source 1410 and is configured to feed a consumable wire electrode 1450 toward the base or part 1040. The power source 1410 and the first wire feeder 1420 are configured to provide energy via the consumable wire electrode 1450 (forming an electric arc 1460 between the electrode 1450 and the base or part 1040) to melt the filler wire 1435 and the consumable wire electrode 1450 (and possibly part of the base or part 1040) during an additive manufacturing process. The computer control apparatus 820 is operatively connected to the first wire feeder 1420, the second wire feeder 1430, and the power source 1410 providing at least partial control thereof. Again, as the additive manufacturing process continues to build successive build layers of the part, the metal material is deposited on a previous build layer, for example, in a similar manner.

Figure 15:
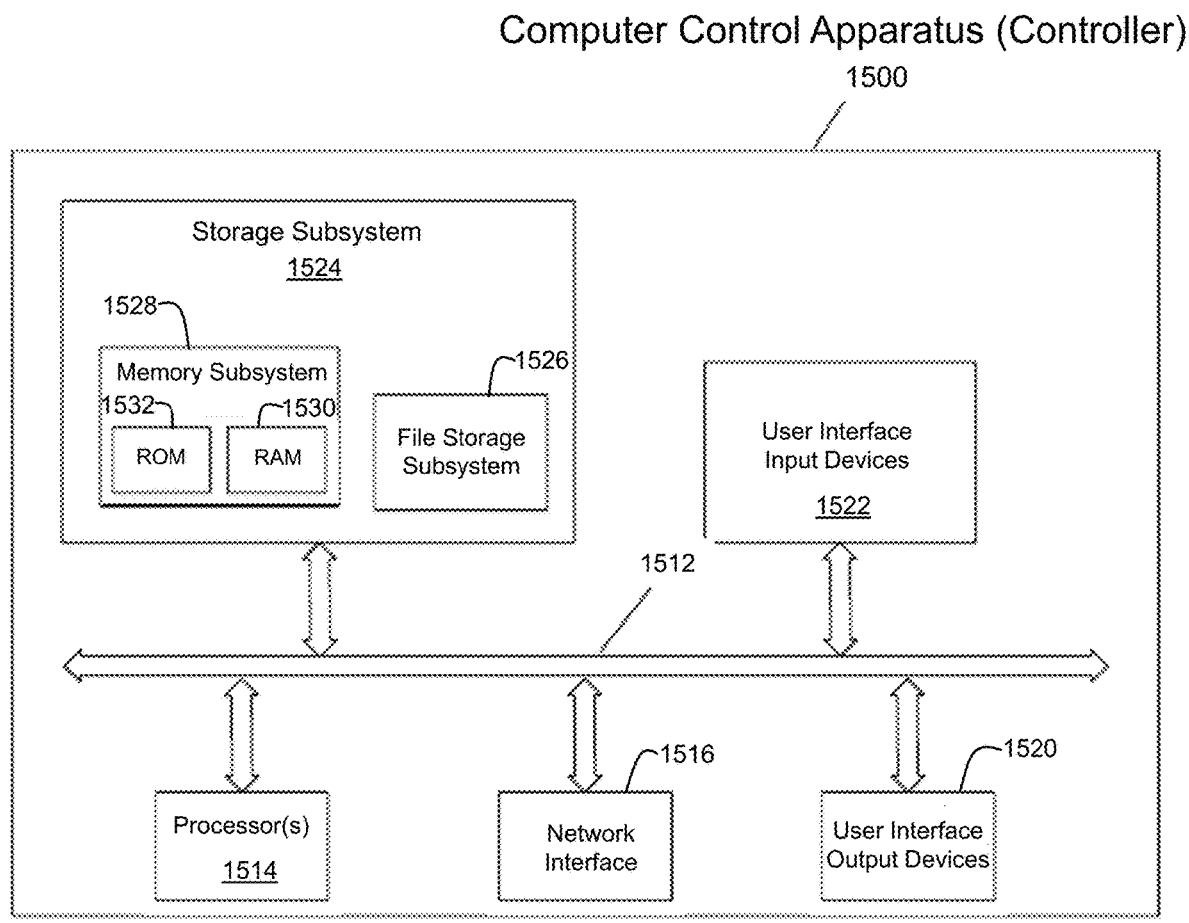
FIG. 15 illustrates one embodiment of an example computer control apparatus or controller of the systems of FIGS. 1, 2, 8, 10, 11, 12, 13, and 14.

FIG. 15 illustrates one embodiment of an example computer control apparatus (or controller) 1500 of the systems of FIGS. 1, 2, 8, 10, 11, 12, 13, and 14. The computer control apparatus (or controller) 1500 includes at least one processor 1514 which communicates with a number of peripheral devices via bus subsystem 1512. These peripheral devices may include a storage subsystem 1524, including, for example, a memory subsystem 1528 and a file storage subsystem 1526, user interface input devices 1522, user interface output devices 1520, and a network interface subsystem 1516. The input and output devices allow user interaction with the computer control apparatus (or controller) 1500. Network interface subsystem 1516 provides an interface to outside networks and is coupled to corresponding interface devices in other computer systems. For example, the computer control apparatus 76 of the system 10 may share one or more characteristics with the computer control apparatus (or controller) 1500 and may be, for example, a conventional computer, a digital signal processor, and/or other computing device.

User interface input devices 1522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the computer control apparatus (or controller) 1500 or onto a communication network.

User interface output devices 1520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computer control apparatus (or controller) 1500 to the user or to another machine or computer system.

Storage subsystem 1524 stores programming and data constructs that provide or support some or all of the functionality described herein (e.g., as software modules). For example, the storage subsystem 1524 may include a CAD model of a 3D part to be additively manufactured and multiple planned build patterns corresponding to multiple build layers of the 3D part.

Software modules are generally executed by processor 1514 alone or in combination with other processors. Memory 1528 used in the storage subsystem can include a number of memories including a main random access memory (RAM) 1530 for storage of instructions and data during program execution and a read only memory (ROM) 1532 in which fixed instructions are stored. A file storage subsystem 1526 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 1526 in the storage subsystem 1524, or in other machines accessible by the processor(s) 1514.

Bus subsystem 1512 provides a mechanism for letting the various components and subsystems of the computer control apparatus (or controller) 1500 communicate with each other as intended. Although bus subsystem 1512 is shown schematically as a single bus, alternative embodiments of the bus subsystem may use multiple buses.

The computer control apparatus (or controller) 1500 can be of varying types including a workstation, server, computing cluster, blade server, server farm, or any other data processing system or computing device. Due to the ever-changing nature of computing devices and networks, the description of the computer control apparatus (or controller) 1500 depicted in FIG. 15 is intended only as a specific example for purposes of illustrating some embodiments. Many other configurations of the computer control apparatus (or controller) 1500 are possible, having more or fewer components than the computer control apparatus (or controller) depicted in FIG. 15.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. An additive manufacturing system, the system comprising:
   a computer control means configured to access multiple planned build patterns, stored as digital data, corresponding to multiple build layers of a three-dimensional (3D) part to be additively manufactured; and
   a metal deposition apparatus configured to deposit metal material to form at least a portion of a build layer of the multiple build layers of the 3D part, wherein the metal deposition apparatus includes:
      a deposition tool having a contact tip,
      a wire feeder operatively connected to the deposition tool and configured to feed a consumable wire electrode of the metal material toward the 3D part through the deposition tool, and
      a power source operatively connected to the wire feeder,
      wherein the power source is configured to provide energy to melt at least the consumable wire electrode during deposition of a beaded weave pattern by forming an arc between the consumable wire electrode and the 3D part, and
   wherein the metal material is deposited as the beaded weave pattern, in accordance with a planned path of a planned build pattern of the multiple planned build patterns, under control of the computer control means, where the planned build pattern corresponds to the build layer, and
   wherein a wire feed speed and at least one of a weave width, a weave frequency, and a weave dwell of the beaded weave pattern are dynamically adjusted during deposition of the beaded weave pattern, under control of the computer control means in accordance with the planned build pattern, as a width of the build layer varies along a length dimension of the build layer, resulting in a dynamically varying bead width of the beaded weave pattern.

2. The system of claim 1, wherein a travel speed in a travel direction along the length dimension of the build layer is dynamically adjusted during deposition of the beaded weave pattern, under control of the computer control means in accordance with the planned build pattern, as the width of the build layer varies along the length dimension of the build layer.

3. The system of claim 1, further comprising a robot operatively connected to at least a portion of the metal deposition apparatus and configured to be controlled by the computer control means during the deposition of the beaded weave pattern to move at least the portion of the metal deposition apparatus relative to the 3D part being additively manufactured in accordance with the planned path of the planned build pattern.

4. The system of claim 1, comprising a robot operatively connected to a base holding the 3D part being additively manufactured and configured to be controlled by the computer control means during the deposition of the beaded weave pattern to move the base relative to the metal deposition apparatus in accordance with the planned path of the planned build pattern.

5. The system of claim 1, wherein a constant metal deposition rate of the metal material is maintained during the deposition of the beaded weave pattern under control of the computer control means.

6. The system of claim 1, wherein a constant contact tip-to-work distance (CTWD) is maintained during the deposition of the beaded weave pattern under control of the computer control means.

7. The system of claim 1, wherein a wave shape of the beaded weave pattern is one of a sinusoidal shape, a triangular shape, or a rectangular shape, in accordance with the planned path of the planned build pattern.

8. A method of filling a build layer of an additively manufactured part, the method comprising:
   accessing a planned build pattern of multiple planned build patterns, stored as digital data, via a computer control means, wherein the multiple planned build patterns correspond to multiple build layers of a three-dimensional (3D) part being additively manufactured;
   depositing a beaded weave pattern of metal material in a deposition travel direction along a length dimension of a build layer of the multiple build layers, via a metal deposition apparatus, under control of the computer control means in accordance with a planned path of the planned build pattern as a width of the build layer varies along the length dimension;
   feeding a consumable wire electrode of the metal material toward the 3D part via a wire feeder of the metal deposition apparatus as part of the depositing;
   providing energy to melt at least the consumable wire electrode, via a power source of the metal deposition apparatus operatively connected to the wire feeder, during the depositing of the beaded weave pattern by forming an arc between the consumable wire electrode and the 3D part; and
   dynamically adjusting a wire feed speed and at least one of a weave width, a weave frequency, and a weave dwell of the beaded weave pattern, under control of the computer control means in accordance with the planned build pattern, as the width varies along the length dimension, resulting in a dynamically varying bead width of the beaded weave pattern.

9. The method of claim 8, further comprising dynamically adjusting a travel speed in the deposition travel direction during the depositing, under control of the computer control means in accordance with the planned build pattern, as the width varies along the length dimension.

10. The method of claim 8, further comprising controlling a robot, operatively connected to at least a portion of the metal deposition apparatus, via the computer control means during the depositing of the beaded weave pattern to move at least the portion of the metal deposition apparatus relative to the 3D part being additively manufactured in accordance with the planned path of the planned build pattern.

11. The method of claim 8, further comprising controlling a robot, operatively connected to a base holding the 3D part being additively manufactured, via the computer control means during the deposition of the beaded weave pattern to move the base relative to the metal deposition apparatus in accordance with the planned path of the planned build pattern.

12. The method of claim 8, wherein a wave shape of the beaded weave pattern is one of a sinusoidal shape, a triangular shape, or a rectangular shape, in accordance with the planned build pattern.

13. An additive manufacturing system, the system comprising:
   a computer control means configured to access multiple planned build patterns, stored as digital data, corresponding to multiple build layers of a three-dimensional (3D) part to be additively manufactured; and
   a metal deposition apparatus configured to deposit metal material to form at least a portion of a build layer of the multiple build layers of the 3D part, wherein the metal deposition apparatus includes:
      a wire feeder configured to feed a filler wire of the metal material toward the 3D part,
      a power source, and
      a laser operatively connected to the power source,
      wherein the power source and the laser are configured to provide energy in the form of a laser beam to melt at least the filler wire during deposition of a beaded weave pattern,
   wherein the metal material is deposited as the beaded weave pattern, in accordance with a planned path of a planned build pattern of the multiple planned build patterns, under control of the computer control means, where the planned build pattern corresponds to the build layer, and
   wherein a wire feed speed and at least one of a weave width, a weave frequency, and a weave dwell of the beaded weave pattern are dynamically adjusted during deposition of the beaded weave pattern, under control of the computer control means in accordance with the planned build pattern, as a width of the build layer varies along a length dimension of the build layer, resulting in a dynamically varying bead width of the beaded weave pattern.

14. An additive manufacturing system, the system comprising:
   a computer control means configured to access multiple planned build patterns, stored as digital data, corresponding to multiple build layers of a three-dimensional (3D) part to be additively manufactured; and
   a metal deposition apparatus configured to deposit metal material to form at least a portion of a build layer of the multiple build layers of the 3D part, wherein the metal deposition apparatus includes:
      a wire feeder configured to feed a filler wire of the metal material toward the 3D part,
      a power source, and
      a non-consumable electrode operatively connected to the power source,
      wherein the power source and the non-consumable electrode are configured to provide energy to melt at least the filler wire during a deposition of a beaded weave pattern by forming an arc between the non-consumable electrode and the 3D part,
   wherein the metal material is deposited as the beaded weave pattern, in accordance with a planned path of a planned build pattern of the multiple planned build patterns, under control of the computer control means, where the planned build pattern corresponds to the build layer, and
   wherein a wire feed speed and at least one of a weave width, a weave frequency, and a weave dwell of the beaded weave pattern are dynamically adjusted during deposition of the beaded weave pattern, under control of the computer control means in accordance with the planned build pattern, as a width of the build layer varies along a length dimension of the build layer, resulting in a dynamically varying bead width of the beaded weave pattern.

15. An additive manufacturing system, the system comprising:
   a computer control means configured to access multiple planned build patterns, stored as digital data, corresponding to multiple build layers of a three-dimensional (3D) part to be additively manufactured; and
   a metal deposition apparatus configured to deposit metal material to form at least a portion of a build layer of the multiple build layers of the 3D part, wherein the metal deposition apparatus includes:
      a first wire feeder configured to feed a filler wire of the metal material toward the 3D part,
      a power source, and
      a second wire feeder operatively connected to the power source and configured to feed a consumable wire electrode of the metal material toward the 3D part,
      wherein the power source is configured to provide energy to melt at least the consumable wire electrode and the filler wire during deposition of a beaded weave pattern by forming an arc between the consumable wire electrode and the 3D part,
   wherein the metal material is deposited as the beaded weave pattern, in accordance with a planned path of a planned build pattern of the multiple planned build patterns, under control of the computer control means, where the planned build pattern corresponds to the build layer, and
   wherein a wire feed speed and at least one of a weave width, a weave frequency, and a weave dwell of the beaded weave pattern are dynamically adjusted during deposition of the beaded weave pattern, under control of the computer control means in accordance with the planned build pattern, as a width of the build layer varies along a length dimension of the build layer, resulting in a dynamically varying bead width of the beaded weave pattern.

16. A method of filling a build layer of an additively manufactured part, the method comprising:
   accessing a planned build pattern of multiple planned build patterns, stored as digital data, via a computer control means, wherein the multiple planned build patterns correspond to multiple build layers of a three-dimensional (3D) part being additively manufactured;
   depositing a beaded weave pattern of metal material in a deposition travel direction along a length dimension of a build layer of the multiple build layers, via a metal deposition apparatus, under control of the computer control means in accordance with a planned path of the planned build pattern as a width of the build layer varies along the length dimension;

feeding a filler wire of the metal material toward the 3D part via a wire feeder of the metal deposition apparatus as part of the depositing;

providing energy to melt at least the filler wire during the depositing of the beaded weave pattern, via a power source of the metal deposition apparatus operatively connected to a laser of the metal deposition apparatus, by forming a laser beam between the laser and the 3D part; and dynamically adjusting a wire feed speed and at least one of a weave width, a weave frequency, and a weave dwell of the beaded weave pattern, under control of the computer control means in accordance with the planned build pattern, as the width varies along the length dimension, resulting in a dynamically varying bead width of the beaded weave pattern.

17. A method of filling a build layer of an additively manufactured part, the method comprising:

accessing a planned build pattern of multiple planned build patterns, stored as digital data, via a computer control means, wherein the multiple planned build patterns correspond to multiple build layers of a three-dimensional (3D) part being additively manufactured;

depositing a beaded weave pattern of metal material in a deposition travel direction along a length dimension of a build layer of the multiple build layers, via a metal deposition apparatus, under control of the computer control means in accordance with a planned path of the planned build pattern as a width of the build layer varies along the length dimension;

feeding a filler wire of the metal material toward the 3D part via a wire feeder of the metal deposition apparatus as part of the depositing;

providing energy to melt at least the filler wire during the depositing of the beaded weave pattern, via a power source of the metal deposition apparatus operatively connected to a non-consumable electrode of the metal deposition apparatus, by forming an arc between the non-consumable electrode and the 3D part; and dynamically adjusting a wire feed speed and at least one of a weave width, a weave frequency, and a weave dwell of the beaded weave pattern, under control of the computer control means in accordance with the planned build pattern, as the width varies along the length dimension, resulting in a dynamically varying bead width of the beaded weave pattern.

18. A method of filling a build layer of an additively manufactured part, the method comprising:

accessing a planned build pattern of multiple planned build patterns, stored as digital data, via a computer control means, wherein the multiple planned build patterns correspond to multiple build layers of a three-dimensional (3D) part being additively manufactured;

depositing a beaded weave pattern of metal material in a deposition travel direction along a length dimension of a build layer of the multiple build layers, via a metal deposition apparatus, under control of the computer control means in accordance with a planned path of the planned build pattern as a width of the build layer varies along the length dimension;

feeding a filler wire of the metal material toward the 3D part via a first wire feeder of the metal deposition apparatus as part of the depositing;

feeding a consumable wire electrode of the metal material toward the 3D part via a second wire feeder of the metal deposition apparatus as part of the depositing;

providing energy to melt at least the consumable wire electrode and the filler wire during the depositing of the beaded weave pattern, via a power source of the metal deposition apparatus operatively connected to the second wire feeder, by forming an arc between the consumable wire electrode and the 3D part; and dynamically adjusting a wire feed speed and at least one of a weave width, a weave frequency, and a weave dwell of the beaded weave pattern, under control of the computer control means in accordance with the planned build pattern, as the width varies along the length dimension, resulting in a dynamically varying bead width of the beaded weave pattern.

19. A method of filling a build layer of an additively manufactured part, the method comprising:

accessing a planned build pattern of multiple planned build patterns, stored as digital data, via a computer control means, wherein the multiple planned build patterns correspond to multiple build layers of a three-dimensional (3D) part being additively manufactured;

depositing a beaded weave pattern of metal material in a deposition travel direction along a length dimension of a build layer of the multiple build layers, via a metal deposition apparatus, under control of the computer control means in accordance with a planned path of the planned build pattern as a width of the build layer varies along the length dimension;

maintaining a constant metal deposition rate of the metal material, during the depositing of the beaded weave pattern, under control of the computer control means; and dynamically adjusting a wire feed speed and at least one of a weave width, a weave frequency, and a weave dwell of the beaded weave pattern, under control of the computer control means in accordance with the planned build pattern, as the width varies along the length dimension, resulting in a dynamically varying bead width of the beaded weave pattern.

* * * * *